(12) United States Patent
Savage-Leuchs et al.

(10) Patent No.: US 8,767,286 B2
(45) Date of Patent: Jul. 1, 2014

(54) SIGNAL AND PUMP MODE-FIELD ADAPTOR FOR DOUBLE-CLAD FIBERS AND ASSOCIATED METHOD

(75) Inventors: Matthias P. Savage-Leuchs, Woodinville, WA (US); Christian E. Dilley, Everett, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 573 days.

(21) Appl. No.: 13/085,462

(22) Filed: Apr. 12, 2011

(65) Prior Publication Data

US 2011/0249321 A1 Oct. 13, 2011

Related U.S. Application Data

(60) Provisional application No. 61/343,948, filed on Apr. 12, 2010.

(51) Int. Cl.
H01S 3/067 (2006.01)
(52) U.S. Cl.
USPC ..................................... 359/341.1; 359/341.3
(58) Field of Classification Search
USPC ............................... 359/341.1, 341.3; 372/70
See application file for complete search history.

(56) References Cited

U.S. PATENT DOCUMENTS

| | | | |
|---|---|---|---|
| 3,823,997 A | 7/1974 | Gloge et al. | |
| 4,176,911 A | 12/1979 | Marcatili et al. | |
| 6,456,756 B1 | 9/2002 | Mead | |
| 6,990,277 B2 | 1/2006 | White | |
| 7,199,924 B1 | 4/2007 | Brown | |
| 7,379,648 B1 | 5/2008 | Brooks et al. | |
| 7,386,211 B1 | 6/2008 | Di Teodoro et al. | |
| 7,391,561 B2 | 6/2008 | Di Teodoro et al. | |
| 7,400,804 B1 | 7/2008 | Di Teodoro et al. | |
| 7,409,128 B2 * | 8/2008 | Holcomb et al. | ............. 385/115 |
| 7,429,734 B1 | 9/2008 | Tidwell | |
| 7,430,352 B2 | 9/2008 | Di Teodoro et al. | |
| 7,471,705 B2 | 12/2008 | Gerstenberger et al. | |
| 7,539,231 B1 | 5/2009 | Honea et al. | |
| 7,620,077 B2 | 11/2009 | Henderson | |

(Continued)

OTHER PUBLICATIONS

Varallyay, et al., "Comparison of amplification in large area fibers using cladding-pump and fundamental-mode core-pump schemes", "Optics Express", Sep. 14, 2009, pp. 17242-17252, vol. 17, No. 20.

Primary Examiner — Mark Hellner
(74) Attorney, Agent, or Firm — Charles A. Lemaire; Jonathan M. Rixen; Lemaire Patent Law Firm, P.L.L.C.

(57) ABSTRACT

A method and apparatus for mode-matching double-clad fibers. In some embodiments, a first fiber section that has a first core, wherein the first core has a first core diameter connects to a mode-field adaptor, wherein the mode-field adaptor includes a first portion having a central volume that has a substantially constant index-of-refraction radial profile and a diameter larger than the first core diameter, and a second portion that has a graded-index (GRIN) central volume, wherein the GRIN central volume has a central axis and a graded index-of-refraction radial profile having an index that gradually decreases at larger distances from its central axis and a length selected to focus light into the core of a second fiber wherein the second core has a diameter that is larger than the first core diameter, and wherein the second fiber section is double clad. Some embodiments are polarized.

27 Claims, 12 Drawing Sheets

(56) References Cited

U.S. PATENT DOCUMENTS

| | | |
|---|---|---|
| 7,671,337 B1 | 3/2010 | Tidwell |
| 7,701,987 B1 | 4/2010 | Savage-Leuchs et al. |
| 7,768,700 B1 | 8/2010 | Savage-Leuchs |
| 7,792,166 B2 | 9/2010 | Borschowa |
| 7,872,794 B1 | 1/2011 | Minelly et al. |
| 8,229,260 B2 * | 7/2012 | Frith ............... 385/43 |
| 2005/0207455 A1 * | 9/2005 | MacCormack et al. .......... 372/6 |
| 2008/0077200 A1 | 3/2008 | Bendett et al. |
| 2008/0180787 A1 | 7/2008 | DiGiovanni |
| 2010/0195678 A1 * | 8/2010 | Kuka ............... 372/6 |
| 2011/0310913 A1 * | 12/2011 | Frith ............... 372/6 |

\* cited by examiner

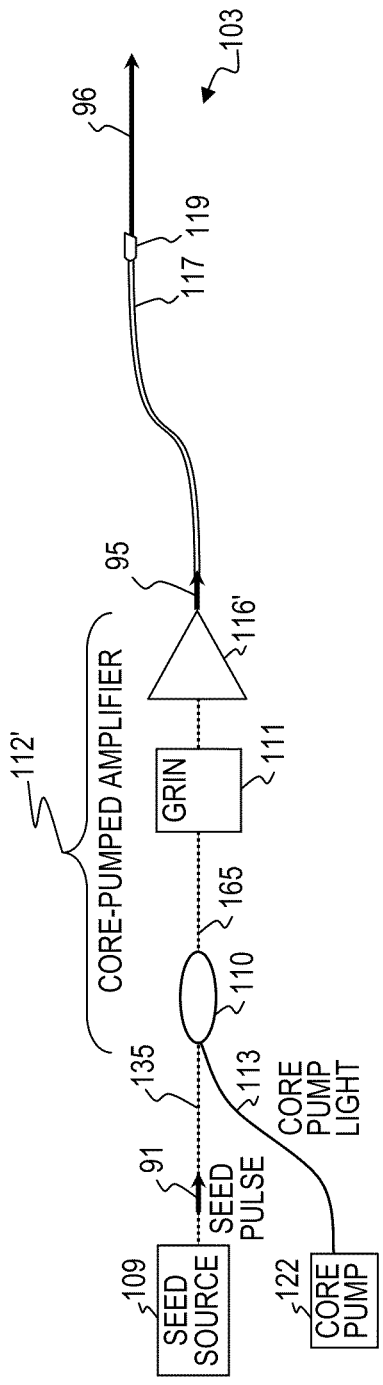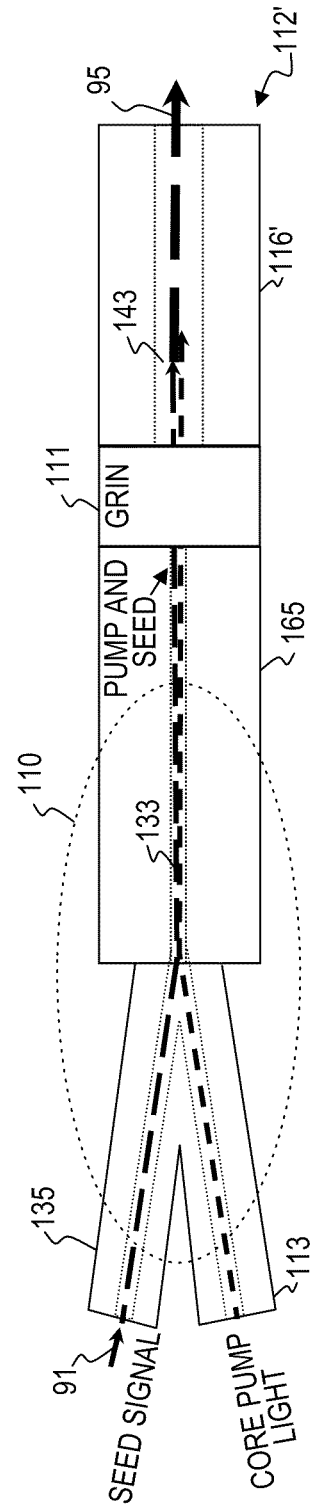
FIG. 1C
PRIOR ART
FIG. 1D
PRIOR ART

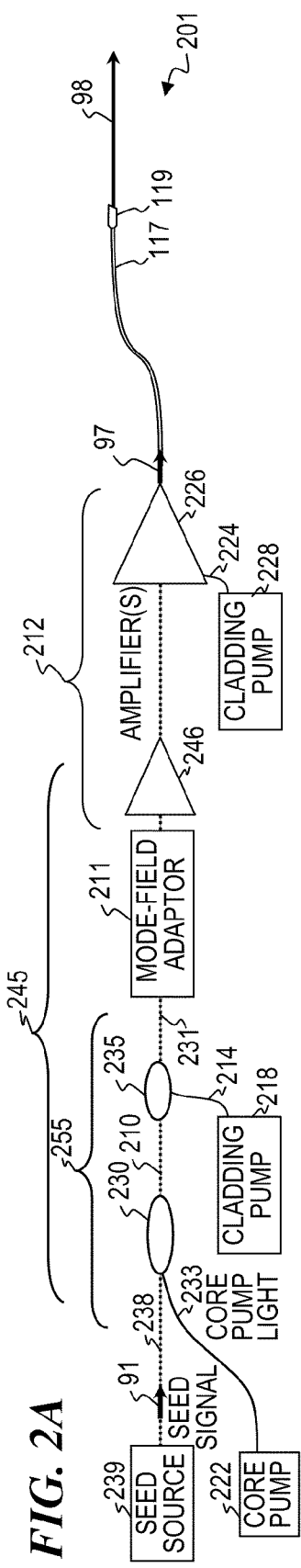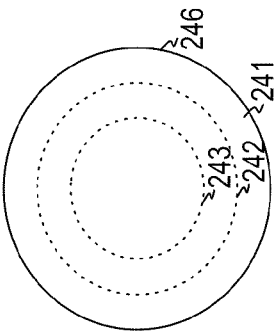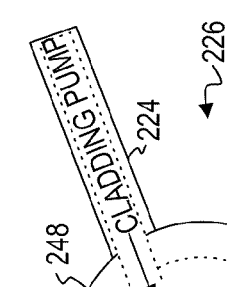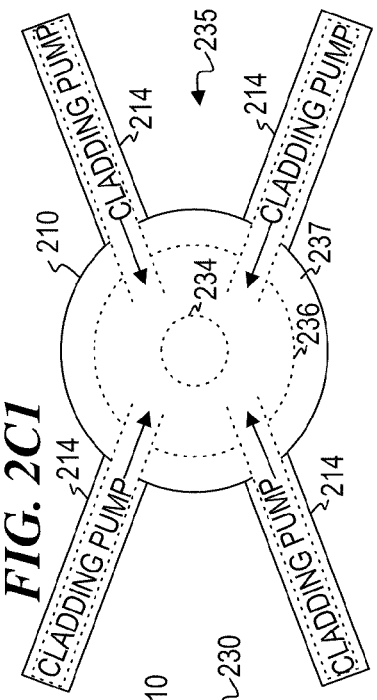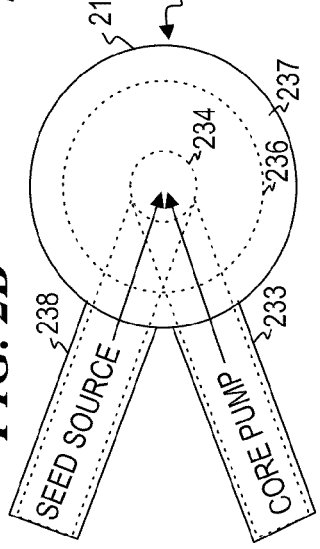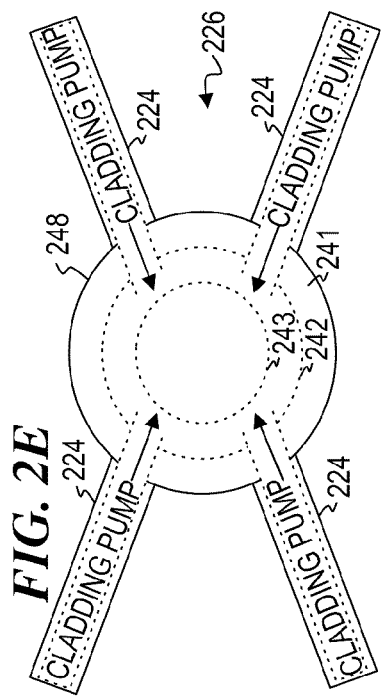

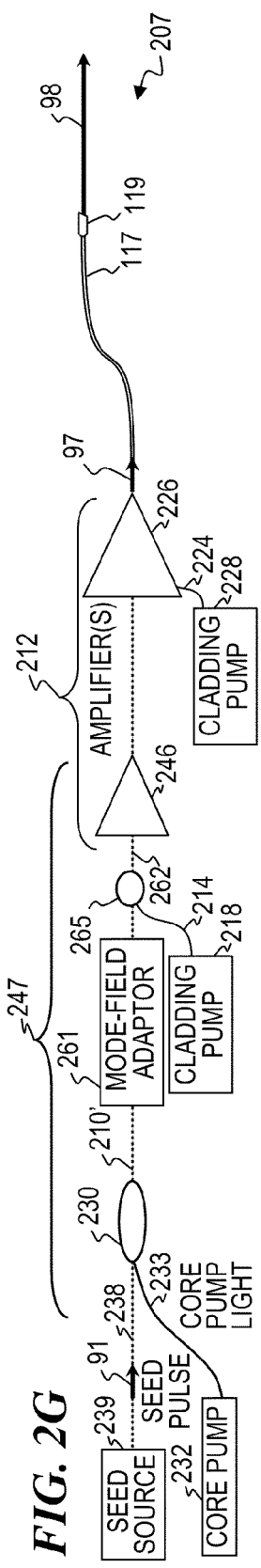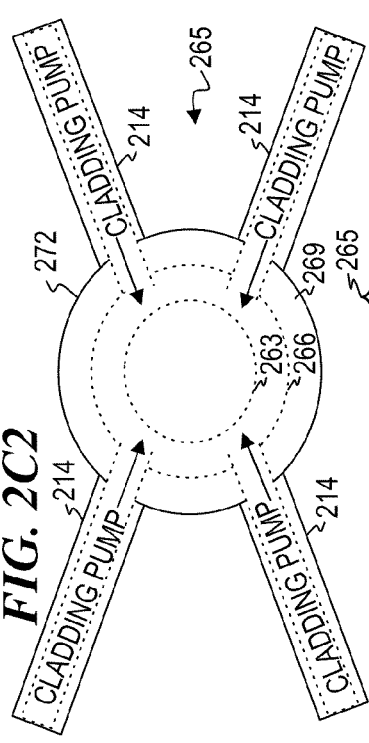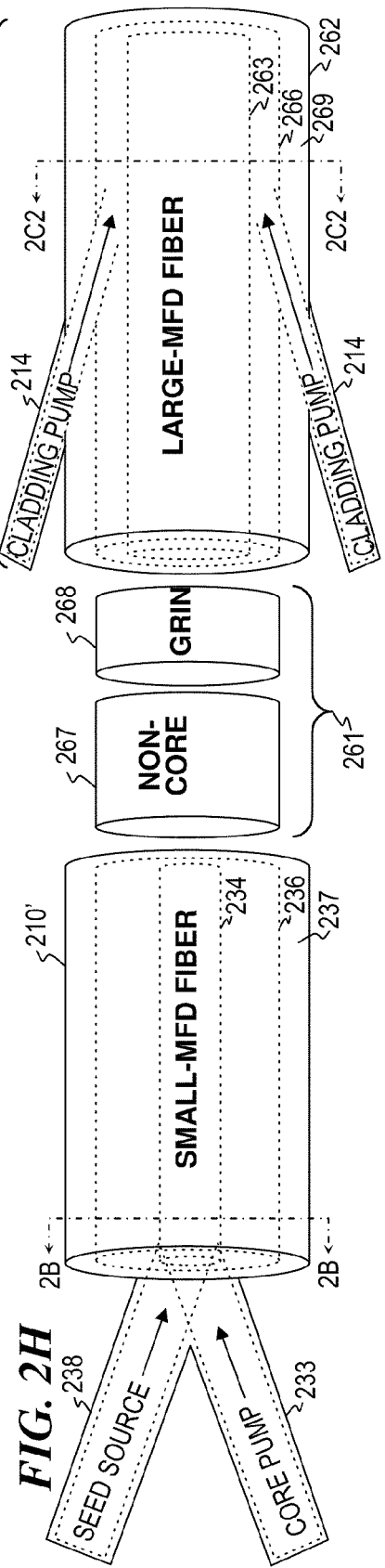

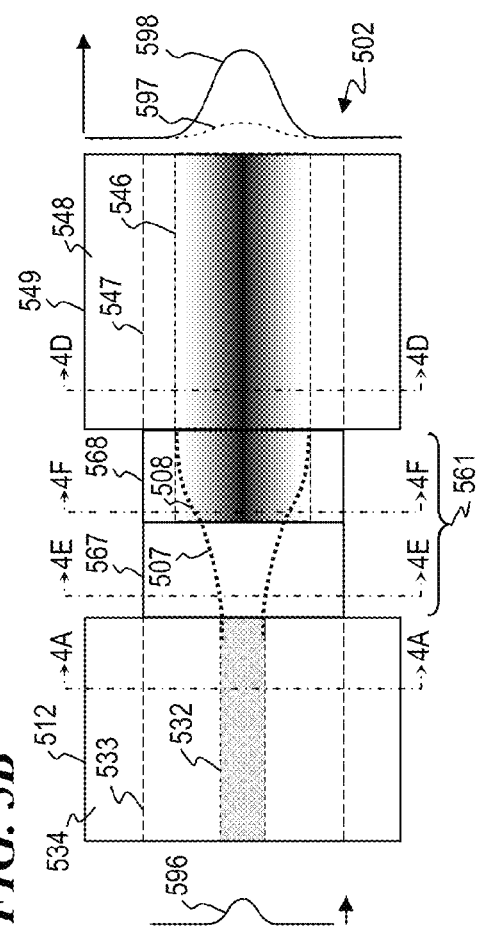
FIG. 5B
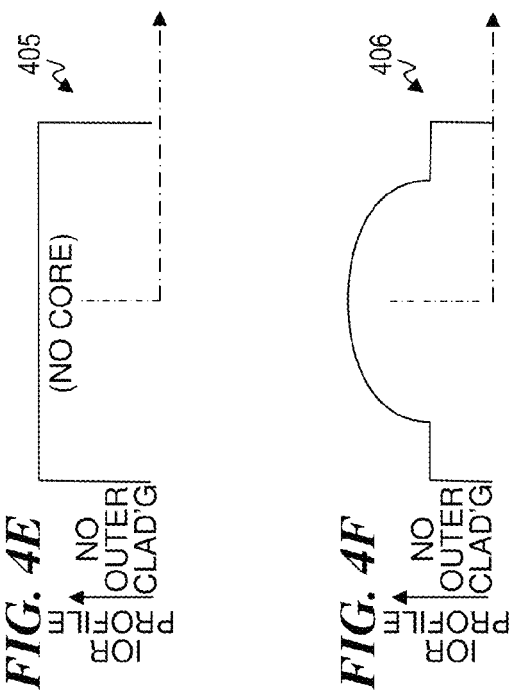
FIG. 4E
FIG. 4F

FIG. 6A GRADED-INDEX FIBER LENS EQUATION $$f_{equiv} = \frac{1}{n_0 \alpha \cdot \sin(\alpha z_1)}$$

$$S_{air} = \frac{1}{n_0 \alpha \cdot \tan(\alpha z_1)}$$

FIG. 6B GRADED INDEX FIBER REFRACTIVE INDEX PROFILE $$n(r) = MAX(n_{IC}, n_0 \cdot \sqrt{1-\alpha^2 r^2})$$

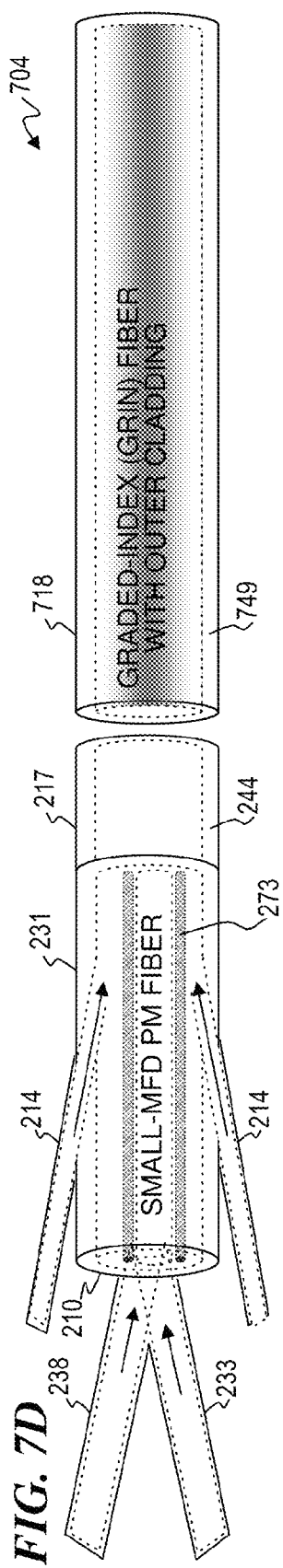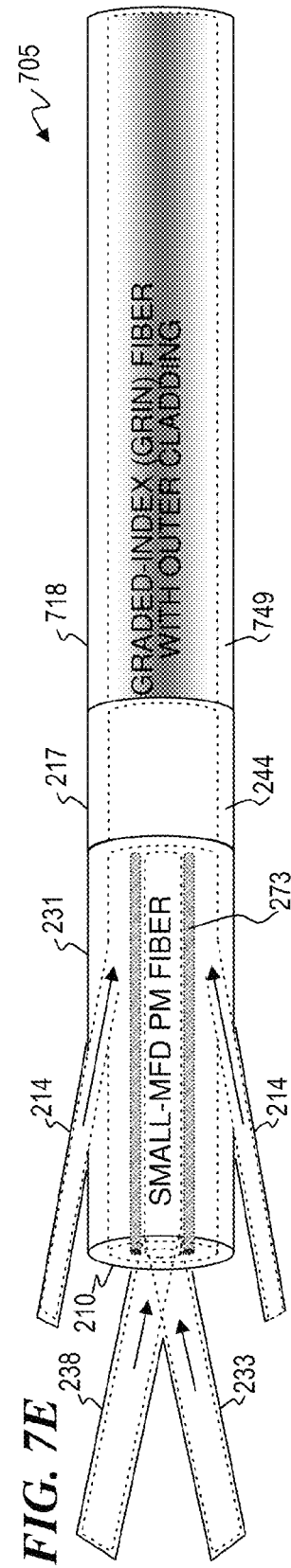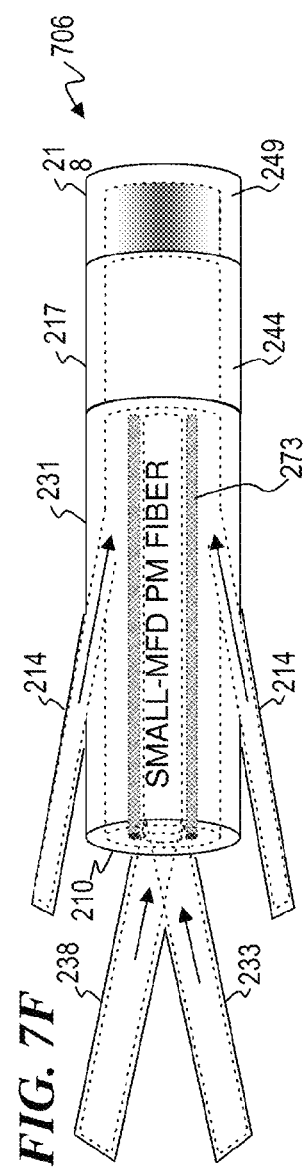
FIG. 7D
FIG. 7E
FIG. 7F

SIGNAL AND PUMP MODE-FIELD ADAPTOR FOR DOUBLE-CLAD FIBERS AND ASSOCIATED METHOD

CROSS-REFERENCE TO RELATED APPLICATIONS

This application claims priority benefit under 35 U.S.C. §119(e) to U.S. Provisional Patent Application 61/343,948 filed on Apr. 12, 2010, titled "SIGNAL AND PUMP MODE-FIELD ADAPTOR FOR DOUBLE-CLAD FIBERS AND ASSOCIATED METHOD" which is incorporated herein by reference in its entirety.

This invention is related to:

P.C.T. Patent Application PCT/US2011/031864 titled "HIGH BEAM QUALITY AND HIGH AVERAGE POWER FROM LARGE-CORE-SIZE OPTICAL-FIBER AMPLIFIERS" filed on Apr. 9, 2011 by Matthias P. Savage-Leuchs and Christian E. Dilley;

P.C.T. Patent Application PCT/US2011/031863 titled "SIGNAL AND PUMP MODE-FIELD ADAPTOR FOR DOUBLE-CLAD FIBERS AND ASSOCIATED METHOD" filed on Apr. 9, 2011 by Matthias P. Savage-Leuchs and Christian E. Dilley;

U.S. Pat. No. 6,456,756 issued Sep. 24, 2002 to Roy Mead et al., titled "FIBER RAMAN AMPLIFIER PUMPED BY AN INCOHERENTLY BEAM COMBINED DIODE LASER,"

U.S. Pat. No. 7,792,166 issued Sep. 7, 2010 to Lawrence A. Borschowa, titled "APPARATUS AND METHOD FOR DRIVING LASER DIODES", U.S. Pat. No. 7,620,077 issued Nov. 17, 2009 to Angus J. Henderson, titled "APPARATUS AND METHOD FOR PUMPING AND OPERATING OPTICAL PARAMETRIC OSCILLATORS USING DFB FIBER LASERS", U.S. Pat. No. 7,701,987 to Matthias P. Savage-Leuchs et al. issued Apr. 20, 2010 titled "APPARATUS AND METHOD FOR GENERATING CHIRP-SLICE CONTROLLED-LINEWIDTH LASER-SEED SIGNALS", U.S. Pat. No. 7,471,705 issued Dec. 30, 2008 to David C. Gerstenberger et al., titled "ULTRAVIOLET LASER SYSTEM AND METHOD HAVING WAVELENGTH IN THE 200-NM RANGE", U.S. Pat. No. 7,391,561 issued Jun. 24, 2008 to Fabio Di Teodoro et al., titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD", U.S. Pat. No. 7,671,337 issued Mar. 2, 2010 to Steven C. Tidwell, titled "SYSTEM AND METHOD FOR POINTING A LASER BEAM", U.S. Pat. No. 7,199,924 issued Apr. 3, 2007 to Andrew J. W. Brown et al., titled "APPARATUS AND METHOD FOR SPECTRAL-BEAM COMBINING OF HIGH-POWER FIBER LASERS", U.S. Pat. No. 7,768,700 issued Aug. 3, 2010 to Matthias P. Savage-Leuchs, titled "METHOD AND APPARATUS FOR OPTICAL GAIN FIBER HAVING SEGMENTS OF DIFFERING CORE SIZES", U.S. Patent Publication 2008/0077200 titled "APPARATUS AND METHOD FOR STIMULATION OF NERVES AND AUTOMATED CONTROL OF SURGICAL INSTRUMENTS" by Bendett et al., U.S. Pat. No. 7,872,794 issued Jan. 18, 2011 to John D. Minelly et al., titled "HIGH-ENERGY EYE-SAFE PULSED FIBER AMPLIFIERS AND SOURCES OPERATING IN ERBIUM'S L-BAND", U.S. patent application Ser. No. 12/624,327 (which issued as U.S. Pat. No. 8,441,718 on May 14, 2013) titled "SPECTRALLY BEAM COMBINED LASER SYSTEM AND METHOD AT EYE-SAFER WAVELENGTHS" filed Nov. 23, 2009 by Roy D. Mead, and U.S. Provisional Patent Application 61/263,736 filed Nov. 23, 2009 by Matthias P. Savage-Leuchs et al., titled "Q-switched oscillator seed-source for MOPA laser illuminator method and apparatus";

which are all incorporated herein in their entirety by reference.

FIELD OF THE INVENTION

The invention relates generally to optical waveguides and more particularly to laser systems using large-core-size optical-fiber gain media that obtain both high beam quality and high average power from high-power master-oscillator power-amplifier (MOPA) laser systems by using a mode-field adaptor that is fused between a small-mode-area (SMA) fiber that carries both a seed signal and core pump light in its core (for pre-amplification of the seed signal within an initial length of the large-mode-area core of the gain fiber described below), and cladding pump light in an inner cladding layer (for high-power amplification of the pre-amplified signal within an extended length of the large-mode-area core of the gain fiber (i.e., downstream of the initial length of the core relative to the signal light)), and a gain fiber having a large-mode-area core, wherein the mode-field adaptor enlarges the cross-sectional spatial mode of the seed signal and core pump light from the SMA fiber, which provides a method and apparatus for mode-matching double-clad fibers.

BACKGROUND OF THE INVENTION

High-power lasers require large core/mode field diameter fibers. Numerous methods exist to achieve good beam quality from large-core fibers, however many of these so-called large mode area fibers are difficult to make and are expensive.

A prime example of structures that achieve good beam quality from large-core fibers are photonic crystal fibers (PCFs). Such PCFs (which have only been demonstrated at 1-micron wavelengths) deliver excellent beam quality with large mode-field diameters (also called large mode-field area (LMA) fibers), however PCFs are extremely difficult to produce, difficult to cleave, and up to now impossible to fusion splice. Therefore, such fibers do not enable a true all-fiber assembly, which is very important when building highly robust laser systems.

In contrast, standard step-index fibers are simple to cleave and fusion splice and allow building of all-fiber laser systems. However, such fibers have typically degraded beam quality due to their high numerical aperture (NA), which is typically in the range of 0.15-0.22.

U.S. Patent Application Publication 2008/0180787 (which issued as U.S. Pat. No. 7,916,386 on Mar. 29, 2011) by DiGiovanni et al. was filed Jan. 26, 2007 titled "High power optical apparatus employing large-mode-area, multimode, gain-producing optical fibers," and is incorporated herein by reference. DiGiovanni et al. describe optical apparatus that includes a multimode, gain-producing fiber for providing gain to signal light propagating in the core of the fiber, and a pump source for providing pump light that is absorbed in the core, characterized in that (i) the pump source illustratively comprises a low brightness array of laser diodes and a converter for increasing the brightness of the pump light, (ii) the pump light is coupled directly into the core, and (iii) the area of the core exceeds approximately 350 μm². In one embodiment, the signal light propagates in a single mode, and the pump light co-propagates in at least the same, single mode, both in a standard input fiber before entering the gain-producing fiber, and a mode expander is disposed between the input fiber and the gain fiber. In another embodiment, multiple pumps are coupled into the core of the gain fiber. The pumps may generate light of the same wavelength or of different wavelengths. In accordance with a particular embodiment of the invention, amplification of nanosecond optical pulses was demonstrated at 1545 nm in a single-clad Er-doped fiber having a core area of 875 μm², wherein the core was pumped by a high-brightness Raman laser at 1480 nm; and the pulses had a record peak power of several hundred kW.

There is a need for improved laser systems, particularly systems that couple light into large-mode-area (LMA) optical-fiber lasers and/or optical-fiber amplifiers from a core of a small-mode area fiber, and mode match the light to the mode of the LMA fiber. There is also a need for such systems optionally having delivery fibers, and wherein such systems have improved beam quality (e.g., $M^2$ that approaches 1) and have very high average and/or peak power.

SUMMARY OF THE INVENTION

In some embodiments, the present invention provides an apparatus, method and use for mode-field matching in a fiber connection between a seed laser, a pump source (in some embodiments, having one or more pump lasers for core pumping and for cladding pumping) and a fiber amplifier. In some embodiments, a mode-field adaptor is fused between a small-mode-area (SMA) fiber that carries both a seed signal and core pump light in its core (for pre-amplification of the seed signal within an initial length of the large-mode-area core of the gain fiber described below), and cladding pump light in an inner cladding layer (for high-power amplification of the pre-amplified signal within an extended length of the large-mode-area core of the gain fiber (i.e., downstream of the initial length of the core relative to the signal light)), and a gain fiber having a large-mode-area core, wherein the mode-field adaptor enlarges the cross-sectional spatial mode of the seed signal and core pump light from the SMA fiber. The present invention provides a method and apparatus for mode-matching double-clad fibers. In some embodiments, a first fiber section that has a first core, wherein the first core has a first core diameter connects to a mode-field adaptor, wherein the mode-field adaptor includes a first portion having a central volume that has a substantially constant index-of-refraction radial profile and a diameter larger than the first core diameter, and a second portion that has a graded-index (GRIN) central volume, wherein the GRIN central volume has a central axis and a graded index-of-refraction radial profile having an index that gradually decreases at larger distances from its central axis and a length selected to focus light into the core of a second fiber section wherein the second core has a diameter that is larger than the first core diameter, and wherein the second fiber section is double clad. Some embodiments are polarized.

BRIEF DESCRIPTION OF THE DRAWINGS

FIG. 1C is a block diagram of a prior-art subsystem 103 that includes a core-pumped fiber optical amplifier 112'.

FIG. 1D is a longitudinal cross-section schematic diagram of prior-art core-pumped fiber optical amplifier 112'.

FIG. 2A is a block diagram of an optical subsystem 201 that includes an optical-amplifier subsystem 245 having a cladding-pump-retaining mode-field adaptor 211 located after the cladding pump light is launched into the cladding, according to some embodiments of the present invention.

FIG. 2B is a lateral cross-section schematic diagram of a core-launching seed-and-pump combiner 230, according to some embodiments of the present invention.

FIG. 2C1 is a lateral cross-section schematic diagram of a cladding-pump injector 235 for small-mode-area fibers, according to some embodiments of the present invention.

FIG. 2C2 is a lateral cross-section schematic diagram of a cladding-pump injector 275 for large-mode-area fibers, according to some embodiments of the present invention.

FIG. 2D is a lateral cross-section schematic diagram of a LMA gain fiber 246, according to some embodiments of the present invention.

FIG. 2E is a lateral cross-section schematic diagram of a cladding-pump injector 226 for large-mode-area fibers, according to some embodiments of the present invention.

FIG. 2G is a block diagram of an optical subsystem 207 that includes an optical-amplifier subsystem 247 having a mode-field adaptor 261 located before the cladding pump light is launched into the cladding 276, according to some embodiments of the present invention.

FIG. 2H is an exploded-view perspective longitudinal schematic diagram partially in cross section of optical-amplifier subsystem 247 that includes a mode-field adaptor 261, according to some embodiments of the present invention.

Figure 5A:
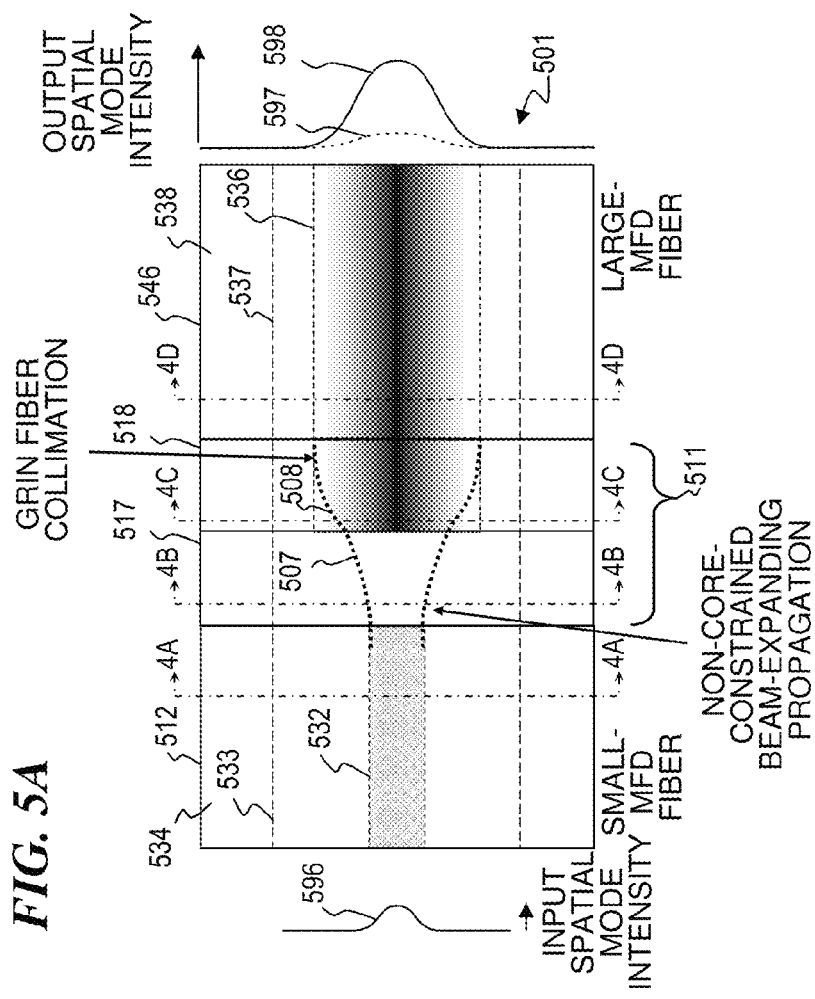

2E or reference 546 as shown in FIG. 5A or reference 549 of FIG. 5B), according to some embodiments of the present invention.

FIG. 4E is a schematic graph 405 of the index-of-refraction lateral cross-section of a section of coreless fiber (such as reference 267 as shown in FIG. 2H or reference 567 as shown in FIG. 5B), according to some embodiments of the present invention.

FIG. 4F is a schematic graph 406 of the index-of-refraction lateral cross-section of a section of GRIN fiber (such as reference 268 as shown in FIG. 2H or reference 568 as shown in FIG. 5B), according to some embodiments of the present invention.

FIG. 5A is a longitudinal-cross-section schematic diagram of an optical-amplifier subsystem 501 that includes a cladding-pump-retaining mode-field adaptor 511, according to some embodiments of the present invention.

FIG. 5B is a longitudinal-cross-section schematic diagram of an optical-amplifier subsystem 502 that includes a mode-field adaptor 561, according to some embodiments of the present invention.

FIG. 6A includes a longitudinal-cross-section schematic diagram of a plain-glass-GRIN mode-field adaptor analysis 601 that shows a mode-field-adaptor ray graph 613 and associated equations, according to some embodiments of the present invention.

FIG. 6B is a lateral-cross-section index-of-refraction-profile graph GRIN lens 602 and associated equation, according to some embodiments of the present invention.

Figure 6C:
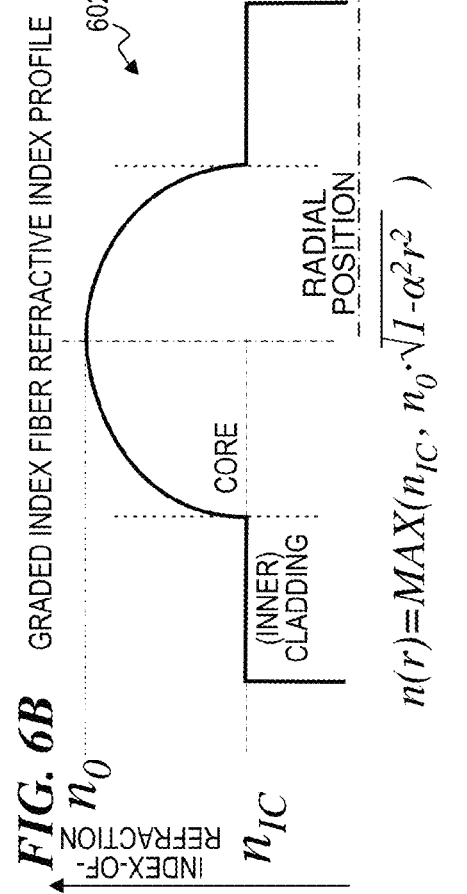
Figure 6C:
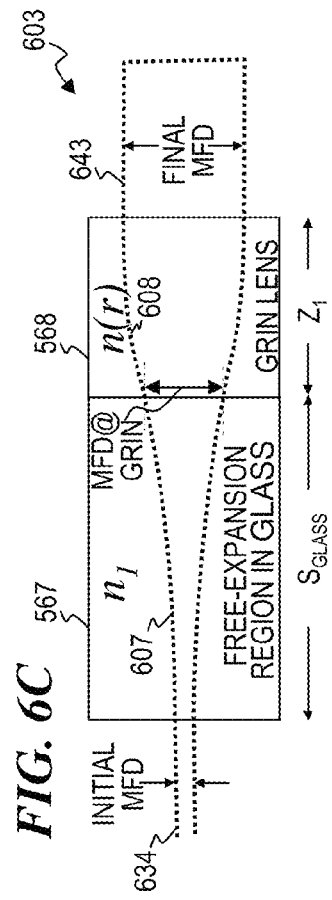
Figure 6C:
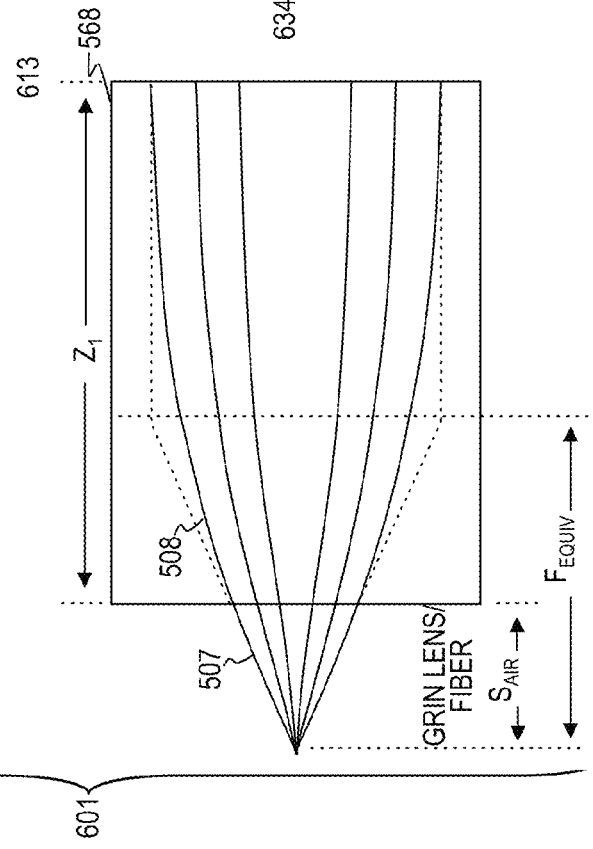

FIG. 6C is a longitudinal-cross-section schematic diagram of a mode-field-adaptor ray graph 603, according to some embodiments of the present invention.

Figure 7A:
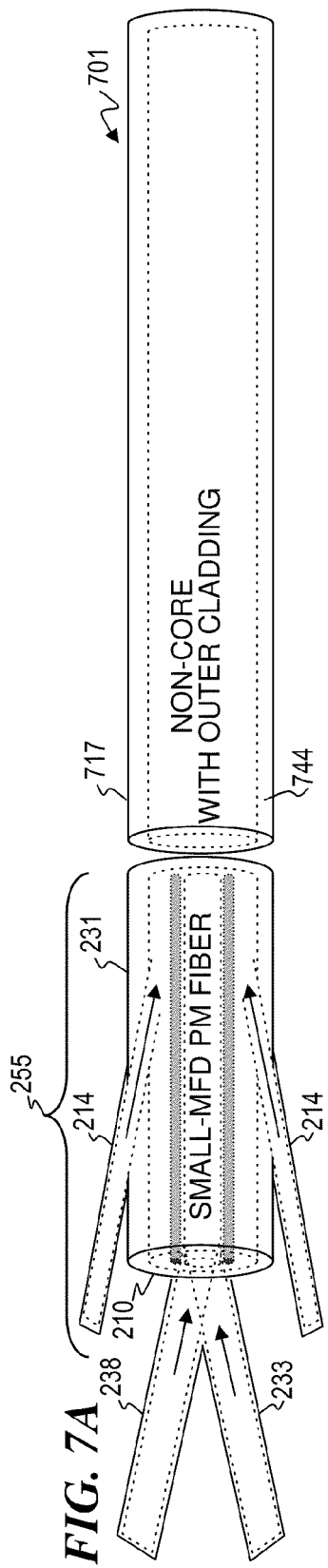

FIG. 7A is a perspective-view longitudinal schematic diagram partially in cross section of a first step 701 of fabricating a polarization-maintaining (PM) small-core to large-core mode-field adaptor of optical-amplifier subsystem 245 (see FIG. 2A1), according to some embodiments of the present invention.

Figure 7B:
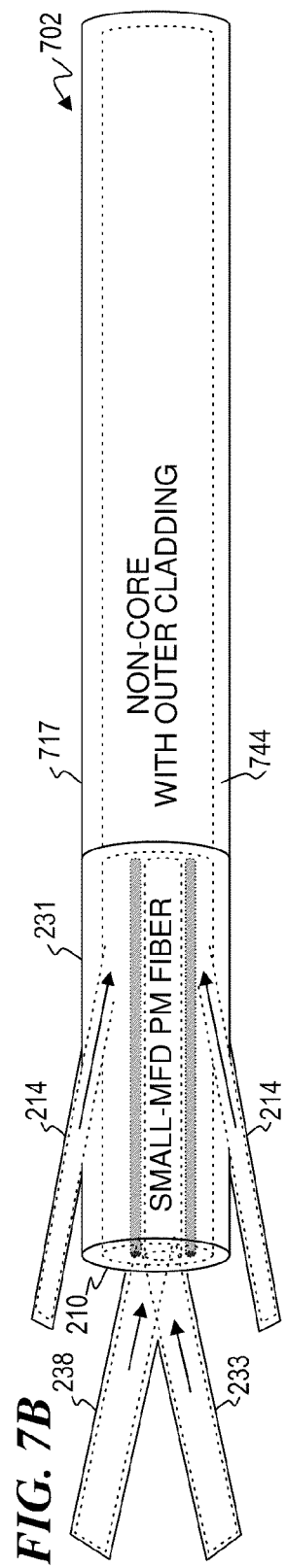

FIG. 7B is a perspective-view longitudinal schematic diagram partially in cross section of a second step 702 of fabricating optical-amplifier subsystem 245, according to some embodiments of the present invention.

Figure 7C:
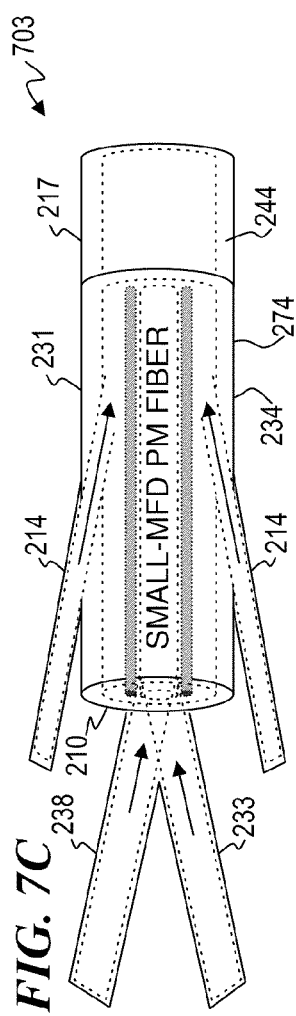

FIG. 7C is a perspective-view longitudinal schematic diagram partially in cross section of a third step 703 of fabricating optical-amplifier subsystem 245, according to some embodiments of the present invention.

FIG. 7D is a perspective-view longitudinal schematic diagram partially in cross section of a fourth step 704 of fabricating optical-amplifier subsystem 245, according to some embodiments of the present invention.

FIG. 7E is a perspective-view longitudinal schematic diagram partially in cross section of a fifth step 705 of fabricating optical-amplifier subsystem 245, according to some embodiments of the present invention.

FIG. 7F is a perspective-view longitudinal schematic diagram partially in cross section of a sixth step 706 of fabricating optical-amplifier subsystem 245, according to some embodiments of the present invention.

Figure 7G:
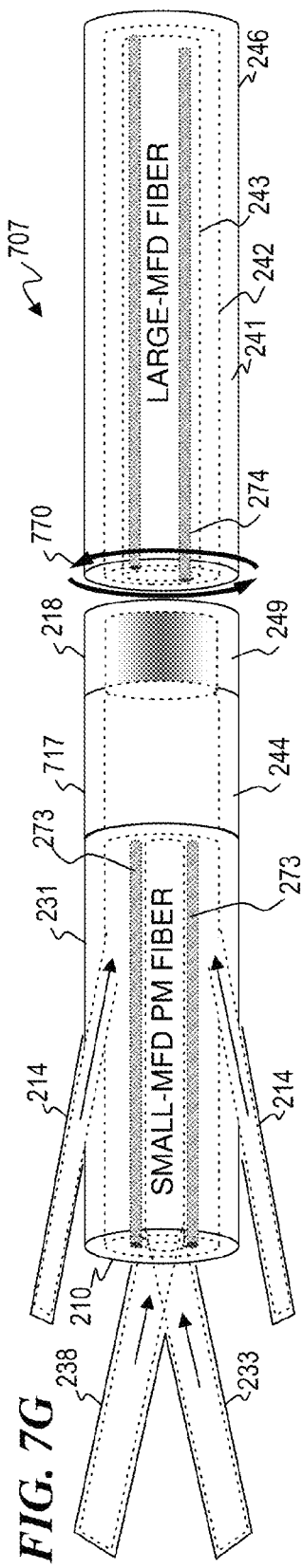

FIG. 7G is a perspective-view longitudinal schematic diagram partially in cross section of a seventh step 707 of fabricating optical-amplifier subsystem 245, according to some embodiments of the present invention.

Figure 7H:
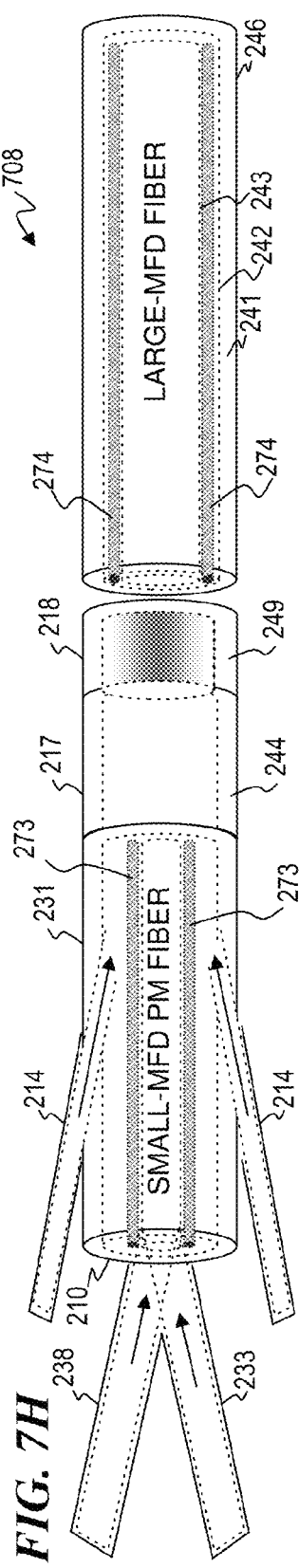

FIG. 7H is a perspective-view longitudinal schematic diagram partially in cross section of a eighth step 708 of fabricating optical-amplifier subsystem 245, according to some embodiments of the present invention.

Figure 7I:
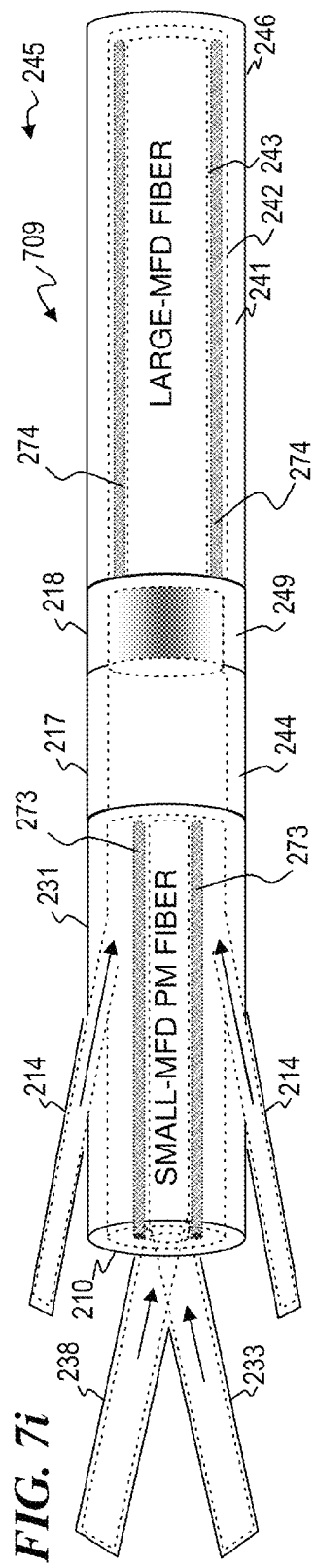

FIG. 7i is a perspective-view longitudinal schematic diagram partially in cross section of a ninth step 709 of fabricating optical-amplifier subsystem 245, according to some embodiments of the present invention.

DETAILED DESCRIPTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

A fiber amplifier includes three basic elements: a tapered fiber bundle (TFB), the pump diodes, and the double-clad gain fiber. Very important is the mode-field adjustment of the optical seed signal into the amplifier. Typically, mode-field adjustment occurs at the input of the tapered fiber bundle with (i) a fiber taper, (ii) a thermally-expanded-core fiber section, or (iii) a specialty fusion splice to the signal port of the tapered fiber bundle. Ideally the mode-field diameter (MFD) of the TFB and the mode-field diameter of the following gain fiber are matched. If the MFD in the TFB and the gain fiber are not matched, the fusion splice between these two components can be optimized to achieve mode matching. However, this is only possible to a limited extent. Additionally, in case of significantly different MFD's, it is of little or no advantage to make a tapered fiber bundle with a large MFD signal port as (i) this approach generally requires a new development of a tapered fiber bundle (TFB) and (ii) the beam propagation of the fundamental mode through the TFB is very sensitive to imperfections (e.g., microbends) of the TFB. In the case where the MFD of the gain fiber is significantly larger than the MFD of the TFB, the existing technologies cannot be applied to adjust to the larger MFD in the gain fiber. Additionally—and extremely importantly for some embodiments—the pump light in the double cladding (DCF output port) of the TFB and gain fiber needs to be propagated into the gain fiber. The latter requirement in combination with the signal transmission cannot be met with current conventional technologies.

By using a short length of coreless fiber (a fiber having a solid center that does not have a waveguide to guide the signal beam) and a short length of a graded-index (GRIN) fiber "lens" as the mode-field adaptor between a fiber having a small core (called a small-mode-area (SMA) or a small-mode-field-diameter (small-MFD) fiber) that delivers an optical-seed signal and multiple claddings, (i) the mode-field diameter between the double clad fiber of the tapered fiber bundle and the double-clad gain fiber can be matched, and (ii) the pump light can be propagated from the tapered fiber bundle through the novel mode-field adaptor of the present invention to the double clad gain fiber. These two performance specifications, to our knowledge, cannot be engineered with the current conventional technology and define one aspect of the invention. The present invention is directed at the propagation of core light (i.e., signal light and pump light that propagate into the core of the gain fiber). The problem of mode matching of both the signal light and the pump light has not been solved by conventional approaches, and is becoming more important in systems having a large-core-diameter fiber (called a large-mode-area (LMA) or a large-mode-field-diameter (large-MFD) fiber) and high-power amplification of laser signals.

In some embodiments, the present invention provides a mode field adaptor for optical fibers which considers core light propagation (and provides a wide mode-field adjustment range) and cladding light propagation.

Some uses of the present invention include advanced long-range optical sensors and high-power lasers in fields of use including military systems.

Figure 1A:
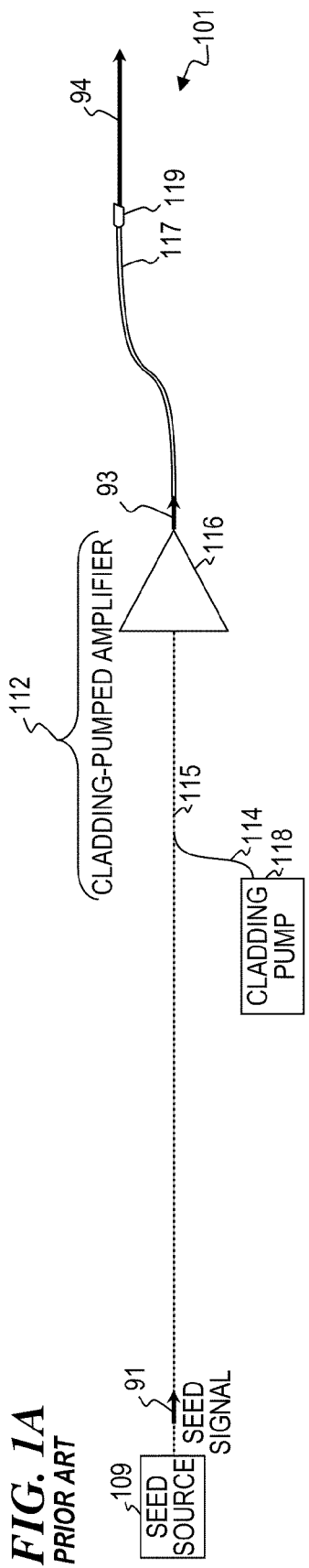
FIG. 1A is a block diagram of a prior-art subsystem 101 that includes a cladding-pumped fiber optical amplifier 112.

FIG. 1A is a block diagram of a prior-art subsystem 101 that includes a cladding-pumped fiber optical amplifier 112. Conventionally, subsystem 101 includes a seed source 109 (e.g., such as a laser) that emits an optical seed signal 91 (such as a continuous-wave (CW) signal or pulsed signal) such as a laser signal, into the core of a double-clad optical fiber 115 which is coupled to amplifier 112 (e.g., including a gain fiber 116), which includes an optical pump source 118 that emits optical pump light (such as laser light having a shorter wavelength than that of the seed signal (e.g., in some embodiments, cladding pump source 118 includes a laser-diode system that supplies cladding pump light having a cladding-pump-light wavelength)) through optical fiber 114. This pump light is propagated into the inner cladding of double-clad optical fiber 115, which is fused to gain medium 116 (such as a rare-earth-doped optical gain fiber), whose output optical signal 93 (an amplified version of seed signal 91) is coupled through delivery fiber 117 and out its endcap 119 as output signal 94. The seed signal 91 typically originates in a small-mode-area fiber (e.g., in some embodiments, configured as a fiber laser). If this seed signal 91 is then coupled into a large-mode-area gain fiber (which is needed to obtain very high output power), the mode-field mismatch causes signal quality of amplified signal 93 to degrade.

Figure 1B:
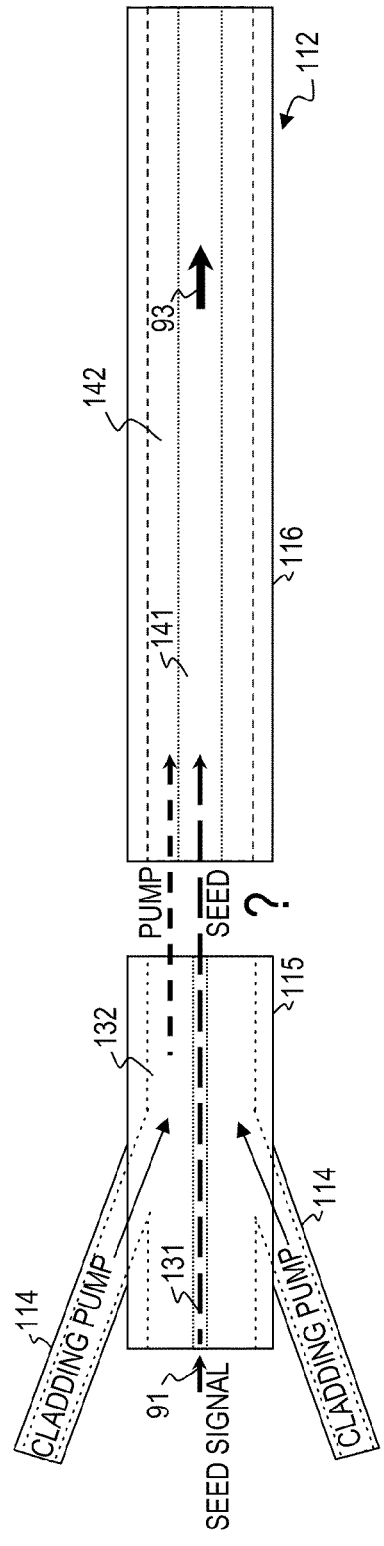
FIG. 1B is a longitudinal cross-section schematic diagram of prior-art cladding-pumped fiber optical amplifier 112.

FIG. 1B is a longitudinal cross-section schematic diagram of prior-art cladding-pumped fiber optical amplifier 112. The various parts and reference numbers that are also shown in FIG. 1A are as described above for FIG. 1A. The seed signal 91 is launched into the left-hand end of the small-mode-area (SMA) core 131 (a core with a small diameter; e.g., 1- to about 25-micron diameter), and pump light is launched into the inner cladding 132 that surrounds core 131 and acts to guide the pump light within its outer boundary (with little or no absorption of the pump light by the cladding) such that the pump light can enter the core 131 and perhaps into core 141 over a distance). It would be desirable for the seed signal 91 to propagate into the left-hand end of the large-mode-area (LMA) core 141 (a core with a large diameter; e.g., about 25- to 100-micron (or, in some embodiments, even to 250 microns or larger core diameter)), and for the pump light to propagate into the left-hand end of the inner cladding 142 that surrounds core 141 and acts to guide the pump light within its outer boundary (with little or no absorption of the pump light by the cladding) such that the pump light can enter the core 141 over a distance). As noted above, the prior art has no good solution for interfacing the pump and seed light from the SMA fiber 115 to the LMA gain fiber 116, and the mode-field mismatch causes signal quality of amplified signal 93 to degrade, so signal quality suffers.

FIG. 1C is a block diagram of a prior-art subsystem 103 that includes a core-pumped fiber optical amplifier 112'. Conventionally, subsystem 103 includes a seed source 109 (e.g., such as a laser) that emits an optical seed signal 91 (such as a continuous-wave (CW) signal or pulsed signal) such as a laser signal, into the core of an optical fiber 135 which is connected to wavelength multiplexor 110 (such as a conventional telecommunications multiplexor), which inserts both pump light 233 from core-pump-light source 122 (e.g., a laser-diode system that supplies core pump light having a core-pump-light wavelength) and seed light 91 onto the core of small-mode-area fiber 165. In some embodiments, a short section of graded-index (GRIN) fiber 111 is fused between small-mode-area fiber 165 and a LMA gain fiber 116' in order to use the focussing properties of the GRIN fiber 111 to adjust the size of the combined pump and seed signal to better match the mode-field size of LMA gain fiber 116'. The larger size and the matched spatial profile of the combined pump and seed signal provides a better quality signal than is obtained using a amplifier system 101 of FIG. 1A, however this system 103 is not scalable to high power since the pump light is all absorbed within a short distance of the entry into LMA gain fiber 116', so high power is not obtainable. If the combined pump light from fiber 113 and seed signal 91 is then coupled into a large-mode-area gain fiber (which is needed to obtain very high output power), the core pump light is absorbed and used for amplification within a short distance, and the doped core further down the fiber merely absorbs the amplified seed signal since no more pump light is available.

FIG. 1D is a longitudinal cross-section schematic diagram of prior-art core-pumped fiber optical amplifier 112'. The various parts and reference numbers that are also shown in FIG. 1C are as described above for FIG. 1C. The seed signal 91 is launched into the left-hand end of the small-mode-area (SMA) core 133 (a core with a small diameter; e.g., 1- to about 25-micron diameter) via fiber 135, and pump light is launched into the left-hand end of the small-mode-area (SMA) core 133 via fiber 113, and core 133 acts to guide both the signal light 91 and the pump light within its outer boundary (with little or no absorption of the pump light by the core 133) and GRIN (graded index) fiber section 111 acts to expand and match the mode of both the signal light and the pump light so they are matched when they enter into core 143 through its left-hand end). It would be desirable to scale such a system, but that cannot be done because the pump light is substantially completely absorbed within a short distance of the left-hand end of core 143 and it is very difficult to increase the pump power entering the end of core 143 much without heat and/or optical damage to the fiber 116'. As noted above, the prior art has no good solution for scaling a core-pumped configuration to high power using LMA gain fiber 116', so signal power suffers.

FIG. 2A is a block diagram of an optical subsystem 201 that includes an optical-amplifier subsystem 245 having a cladding-pump-retaining mode-field adaptor 211 located after the cladding pump light is launched into the cladding, according to some embodiments of the present invention. In some embodiments, optical subsystem 201 includes a seed source 239 (e.g., such as a laser) that emits an optical seed signal 91 (such as a continuous-wave (CW) signal or pulsed signal) such as a laser signal having a signal-light wavelength, into the core of an optical fiber 238 which is connected to wavelength multiplexor 230 (such as a conventional telecommunications multiplexor), which inserts both pump light 233 from core-pump-light source 222 and seed light 91 onto the core of small-mode-area fiber 210.

In some embodiments, a small-mode-area fiber is one having a mode diameter of between about 1 micron and about 25 microns, or in some embodiments, up to just smaller than about 40 microns. In some embodiments, a large-mode-area fiber is one having a mode diameter of between about 40 microns and about 250 microns, or in some embodiments, no smaller than about 40 microns, or no smaller than about 25 microns, or in some other embodiments, no smaller than about 50 microns.

In some embodiments, core-pump-cladding-pump-and-signal-fiber assembly 255 includes a cladding-pump-light injector 235 is fused to (or part of) fiber 210, and receives cladding pump light from one or more cladding pump sources 218 through one or more optical fibers 214 and inserts the cladding pump light into an inner cladding 236 (see FIG. 2B, in which the dashed line labeled 236 represents the outer diameter of the inner cladding 236 and the dashed line labeled 234 represents the inner diameter of the inner cladding and the outer diameter of the core 234) of small-mode-area fiber 210 (which has reference number 231 after cladding-pump-light injector 235). The cladding pump light propagates (in a rightward direction in the figures) in inner cladding 236 of small-mode-area fiber 231, while the previously combined seed signal and core pump light propagates (in a rightward direction in the figures) in the core of fiber 231. In some embodiments, a mode-field adaptor 211 is fused between small-mode-area fiber 231 and a large mode-field area (LMA) gain fiber 246 in order to use the beam-enlarging of a coreless fiber and focussing properties of a GRIN fiber in mode-field adaptor 211 to enlarge and adjust both the size and divergence angle (i.e., by collimating the beam as it enters the LMA gain fiber 246) of the combined pump and seed signal to better match the mode-field size of LMA gain fiber 246. (In other embodiments, a piece of double-clad LMA fiber having an undoped core, to be used as an input signal delivery fiber (not shown here) is inserted and fused between mode-field adaptor 211 and LMA gain fiber 246.) In some embodiments, the cladding pump light is also propagated from the inner cladding of SMA fiber 231 to the inner cladding of LMA gain fiber 246 by mode-field adaptor 211. The larger size and the matched spatial profile of the combined pump and seed signal provides a better quality signal than is obtained using a amplifier system 101 of FIG. 1A, and the core pump light (which has a mode profile that is matched to the seed signal mode profile) provides a high-quality and strong seed signal for further amplification using the cladding pump light that enters the core of gain fiber 246 further down its length. Accordingly this system 201 is both scalable to high power since the cladding pump light is not all absorbed within a short distance of the entry into LMA gain fiber 146, but enters the core over a much longer fiber length so high power is obtained. At the same time, a high-quality signal is obtained by the mode-matched seed signal and core pump light, which together provide a high-quality pre-amplified seed signal within the initial length of gain fiber 146. In some embodiments, one or more further cladding-pumped optical amplifiers 226, each having additional cladding pump light inserted to their inner cladding from cladding pump sources 228 through optical fibers 224. As described above, the amplified high-quality output optical signal 97 (an amplified version of seed signal 91) is coupled through delivery fiber 117 and out its endcap 119 as output signal 98. In some embodiments, the cladding pump light from cladding pump sources 228 is inserted in a counter-propagating direction relative to the signal light (i.e., in a right-to-left direction in this figure). FIG. 2B, FIG. 2C1, FIG. 2D and FIG. 2E (described below) are schematic cross-sectional end views of various components shown in FIG. 2A1.

FIG. 2B is an end-view of a lateral cross-section schematic diagram of a core-launching seed-and-pump combiner 230, schematically showing seed signal 238 and core pump light 233 being combined and inserted to the core 234 of double-clad fiber 210, which also has an inner cladding 236 and an outer cladding 237.

FIG. 2C1 is a lateral cross-section schematic diagram of a cladding-pump injector 235 for small-mode-area fibers (as shown in FIG. 2G), according to some embodiments of the present invention, schematically showing cladding pump light 214 inserted to the inner cladding 236 of double-clad fiber 210 (i.e., the cladding pump light is inserted outside of core 234 and inward of the inner diameter of outer cladding 237).

FIG. 2C2 is a lateral cross-section schematic diagram of a cladding-pump injector 275 for large-mode-area fibers (as shown in FIG. 2A2), according to some embodiments of the present invention. In some embodiments, cladding-pump injector 275 of FIG. 2C2 is similar to cladding-pump injector 226 of FIG. 2E except that the mode-field adaptor 271 adapts the mode field of the core-pump light and the signal light to match the LMA core of fiber 272 but has no cladding pump light since the cladding-pump light is launched into the cladding 276 surrounding large-mode-area core 273 after the core-pump light and signal light have been mode matched and launched into that core 273. In some embodiments, a plurality of cladding-pump-delivering fibers are fused such that cladding pump light is launched from their cores into inner cladding layer 276, and this cladding-pump light gradually enters the core 273 (and/or core 243 of a subsequent gain fiber 246) over a length of the core, providing high-power scalability. In some embodiments, the core 273 is undoped and is fusion spliced to doped core 243 of amplifier fiber 246. In other embodiments, the core 273 is doped and is essentially one end of doped core 243 of amplifier fiber 246.

FIG. 2D is a lateral cross-section schematic diagram of a LMA gain fiber 246, according to some embodiments of the present invention. In some embodiments, LMA gain fiber 246 includes a core 243 having a large mode area (e.g., in some embodiments, a mode diameter of at least 35 microns, in other embodiments, a mode diameter of at least 40 microns, in yet other embodiments, a mode diameter of at least 50 microns, a mode diameter of at least 75 microns, or a mode diameter of at least 100 microns). Core 243 is surrounded by an inner cladding 242 having a lower index of refraction than that of the core 243 (which is used to carry cladding pump light), which in turn is surrounded by an outer cladding 241 having a lower index of refraction than that of the inner cladding 242 (which is used to contain the cladding pump light within the inner cladding).

FIG. 2E is a lateral cross-section schematic diagram of a cladding-pump injector 226 for large-mode-area fibers, according to some embodiments of the present invention. In some embodiments, the LMA fiber 248 has an undoped core and is fused to a gain fiber 246 having a rare-earth-doped core (e.g., gain fiber 246 of FIG. 2A and FIG. 2D), while in other embodiments, the LMA fiber 248 has a doped core and is a gain fiber (e.g., forms the left-hand end of gain fiber 246). FIG. 2E schematically shows cladding pump light 224 inserted to the inner cladding 242 of double-clad fiber 248 (i.e., the cladding pump light is inserted outside of core 243 and inward of the inner diameter of outer cladding 241).

Figure 2F:
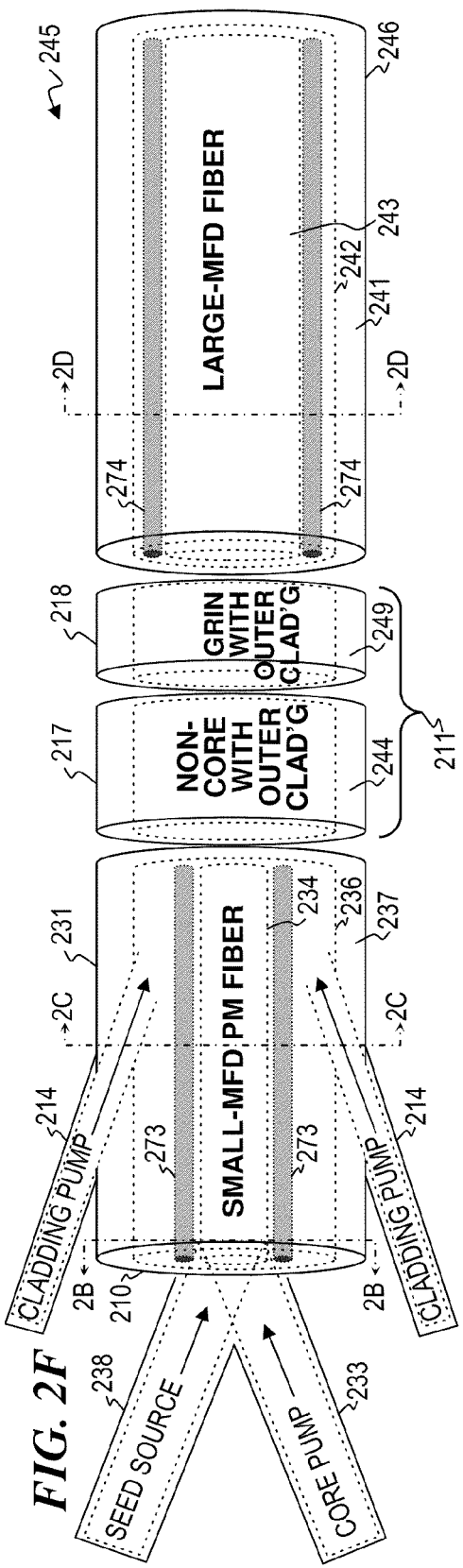
FIG. 2F is an exploded-view perspective longitudinal schematic diagram partially in cross section of optical-amplifier subsystem 245 that includes a cladding-pump-retaining mode-field adaptor 211, according to some embodiments of the present invention.

FIG. 2F is an exploded perspective view of a longitudinal schematic diagram partially in cross section that schematically shows an optical-amplifier subsystem 245 that includes a cladding-pump-retaining mode-field adaptor 211, according to some embodiments of the present invention. The cross-section-indication dash-dot-line arrows 2B, 2C, and 2D in this FIG. 2F are the locations to which the cross-section diagrams of FIG. 2B, FIG. 2C, and FIG. 2D refer. In some embodiments, subsystem 245 includes a small-mode-area (SMA) fiber 210 that is fused to a mode-field adaptor 211 that in turn is fused to a large-mode-area (LMA) fiber 246. In some embodiments (such as that shown here in FIG. 2F), SMA fiber 210 is a polarization-maintaining (PM) fiber (e.g., one that includes two stress-rods 273 located opposite one another adjacent to core 234, or other suitable polarization-maintaining means), and LMA fiber 246 is a polarization-maintaining (PM) fiber (e.g., one that includes two stress-rods 274 located opposite one another adjacent to core 243, or other suitable polarization-maintaining means). In some embodiments, mode-field adaptor 211 is sufficiently short that the polarization of light from core 234 is maintained across mode-field adaptor 211 and into core 243. In some embodiments, mode-field adaptor 211 includes a short section of non-core fiber 217 (e.g., in some embodiments, non-core fiber 217 is less than 1 mm in length, or in other embodiments, even less than 0.5 mm in length) having an outer cladding 244 that maintains cladding pump light inward of outer cladding 244. Non-core fiber 217 provides a beam-expansion function for the combined seed signal and core-pump light emerging from core 234 of SMA fiber 210. Non-core fiber 217 is fused to short section of GRIN fiber 218 (e.g., in some embodiments, GRIN fiber 218 is less than 1 mm in length, or in other embodiments, even less than 0.5 mm in length). GRIN fiber 218 provides a beam-focussing function for the combined seed signal and core-pump light that has been expanded by the short section of non-core fiber 217.

In some embodiments, the length of non-core fiber 217 and the length of GRIN fiber 218 are selected according to the guidelines set forth below in order to convert the small-mode-field diameter beam from the core 234 of fiber 210 to provide a highly collimated single-mode beam that matches the mode-field diameter of LMA fiber 246.

In some embodiments, optical-amplifier subsystem 245 combines seed light 239 and core-pump light 233 into the core of double-clad small-mode-area (SMA) fiber 210 as described above for FIG. 2B, and inserts a very large amount of cladding pump light 214 into the inner cladding 236 of double-clad SMA fiber 210, (which is referred to as SMA fiber 231 after the cladding pump light is inserted) as described above for FIG. 2C. In some embodiments, substantially all the cladding pump light in the inner cladding 236 (inward of outer cladding 237) is maintained inward of outer cladding 244 of the non-core fiber section 217, inward of outer cladding 249 of the GRIN fiber section 218, and then into inner cladding 242 of LMA fiber 246 (inward of the outer cladding 241 of LMA fiber 246). Thus the cladding pump light from SMA fiber 231 propagates as cladding pump light in LMA fiber 246 and gradually enters core 243 over the length of LMA fiber 246.

In some embodiments, a relatively long piece of non-core fiber is fusion spliced to a polarization-maintaining (PM) SMA fiber 210, then it is examined under a microscope and cleaved to the predetermined length for non-core section 217 (as described below), then a relatively long piece of GRIN fiber is fusion spliced to non-core section 217, then it is cleaved to the predetermined length for GRIN section 218. Thus mode-field adaptor 211 is formed. Then PM LMA fiber 246 is butt-aligned to GRIN section 218, polarized light is coupled (e.g., by a fiber 238) into the core 234 of fiber 210, and a light sensor is coupled to receive light from the far end of PM LMA fiber 246 (the right-hand end in FIG. 2F). PM LMA fiber 246 is then slowly rotated while monitoring the amount of light detected by the light sensor to determine the alignment angle that couples the highest amount of polarized signal light across mode-field adaptor 211 (such that the polarization direction of PM SMA fiber 210 is aligned to that of PM LMA fiber 246) and PM LMA fiber 246 is fused to mode-field adaptor 211 at this alignment orientation. These embodiments thus couple a combined beam of core pump light and polarized seed signal light from the core 234 of PM SMA fiber 210 to the core 243 PM LMA fiber 246 while expanding and matching the mode and polarization of the combined beam to the fundamental mode and polarization of PM LMA fiber 246, while also coupling cladding pump light from cladding 236 across mode-field adaptor 211 into cladding 242.

In other embodiments (not shown), optical-amplifier subsystem 245 uses a SMA fiber that does not include polarization-maintaining structures (i.e., not include stress rods 273 or 274, such as SMA fiber 210' shown in FIG. 2H), and that does not use or require polarized signal light. These embodiments thus couple a combined beam of core pump light and unpolarized seed signal light from the core 234 of SMA fiber 210 to the core 243 of a non-PM version of LMA fiber 246 while expanding and matching the mode of the combined beam to the fundamental mode of the non-PM version of LMA fiber 246, while also coupling cladding pump light from cladding 236 across mode-field adaptor 211 into cladding 242.

FIG. 2G is a block diagram of an alternative optical subsystem 207 that includes an optical-amplifier subsystem 247 having a mode-field adaptor 261, according to some embodiments of the present invention. In some embodiments, subsystem 207 of FIG. 2G is substantially similar to subsystem 201 of FIG. 2A, except that the cladding pump light is introduced into the inner cladding of a LMA fiber 248 after the mode-field adaptor 261, and thus a simpler configuration can be used for mode-field adaptor 261 (i.e., no outer cladding need be used in some embodiments of mode-field adaptor 261, while in other embodiments, an outer-cladding layer (such as a polymer) having a lower index-of-refraction may be deposited onto mode-field adaptor 261) than is used for mode-field adaptor 211 described for FIG. 2A and FIG. 2F above. In some embodiments, subsystem 207 need not retain cladding pump light since the cladding-pump light is launched into the cladding 276 surrounding large-mode-area core 273 after the core-pump light and signal light have been mode matched and launched into that core 273. In some embodiments, optical subsystem 207 includes a seed source 239 (e.g., such as a laser) that emits an optical seed signal 91 (such as a continuous-wave (CW) signal or pulsed signal) such as a laser signal, into the core of an optical fiber 238 which is connected to wavelength multiplexor 230 (such as a conventional telecommunications multiplexor), which inserts both pump light 233 from core-pump-light source 232 and seed light 91 onto the core of small-mode-area fiber 210. In some embodiments, the core 263 (see FIG. 2H) is undoped and is fusion spliced to doped core 243 of amplifier fiber 246. In other embodiments, the core 263 is doped and is essentially one end of doped core 243 of amplifier fiber 246. FIG. 2B, FIG. 2C2, FIG. 2D and FIG. 2E (described above) are schematic cross-sectional end views of various components shown in Figure G.

FIG. 2H is a perspective longitudinal schematic diagram partially in cross section of optical-amplifier subsystem 247 (described above for FIG. 2G) that includes a mode-field adaptor 261, according to some embodiments of the present invention. Since the cladding pump light is inserted after the mode-field adaptor 261, the short section of non-core fiber 267 does not need an outer cladding (although some embodiments may apply one after the other components are assembled), and the short section of GRIN fiber 268 does not need an outer cladding (although some embodiments may apply one after the other components are assembled). Since mode-field adaptor 261 does not need to propagate cladding pump light from its input to its output, it does not require an outer cladding; however, some embodiments include an outer cladding (such as a polymer having a lower index of refraction than that of mode-field adaptor 261) in order to protect the junctions and fibers. The cross-section-indication arrows 2B and 2C2 in this figure are the locations to which FIG. 2B and FIG. 2C2 refer.

In other embodiments, a mode-field adaptor 261 such as described for FIG. 2H is substituted for mode-field adaptor 211 in FIG. 2F, fused between SMA fiber 231 and LMA fiber 246. In some embodiments, this mode-field adaptor 261 is then coated with an outer cladding having a lower index of refraction to provide an equivalent structure to mode-field adaptor 211.

In contrast to subsystem 201 of FIG. 2A, the combined seed signal and core-pump light from SMA fiber 210' of FIG. 2H is expanded and matched to the mode of LMA fiber 248 by mode-field adaptor 261, and the cladding pump light is inserted into the inner cladding 266 of double-clad LMA fiber 248 after the mode-field adaptor 261. In some embodiments, a cladding-pump-light injector 265 is fused to (or part of) LMA fiber 248 or LMA gain fiber 246, and receives cladding pump light from one or more cladding pump sources 218 through one or more optical fibers 214 and inserts the cladding pump light (in a rightward direction in the figures) into an inner cladding 266 of LMA fiber 262, while propagating (in a rightward direction in the figures) the previously combined seed signal and core pump light in the core of LMA fiber 262. In some embodiments, LMA fiber 262 is simply the input end of LMA gain fiber 246, while in other embodiments, LMA fiber 262 has an undoped core and has its output end fused to LMA gain fiber 246.

Referring further to FIG. 2G and FIG. 2H, in some embodiments, mode-field adaptor 261 is fused between small-mode-area fiber 210' and a LMA gain fiber 262 in order to use the beam-enlarging of a coreless fiber 267 and focussing properties of a GRIN fiber 268 in mode-field adaptor 261 to enlarge and adjust the size of the combined pump and seed signal to better match the mode-field size of LMA gain fiber 246. The larger size and the matched spatial profile of the combined pump light 238 and seed signal 233 provides a better quality signal than is obtained using a amplifier system 101 of FIG. 1A, and the core pump light from core pump source 232 (which has a mode profile that is matched to the seed signal mode profile) provides a high-quality and strong seed signal for further amplification using the cladding pump light that enters the core of gain fiber 246 further down its length. Accordingly this system 207 is both scalable to high power since the cladding pump light is not all absorbed within a short distance of the entry into LMA gain fiber 146, but can enter the core over a much longer fiber length so high power is obtained. At the same time, a high-quality signal is obtained because of the mode-matched seed signal and core pump light. In some embodiments, one or more further cladding-pumped optical amplifiers 226 (each having additional cladding pump light inserted to their inner cladding from cladding pump sources 228 through optical fibers 224. As described above, the amplified high-quality output optical signal 97 (an amplified version of seed signal 91) is coupled through delivery fiber 117 and out its endcap 119 as output signal 98.

Figure 3A:
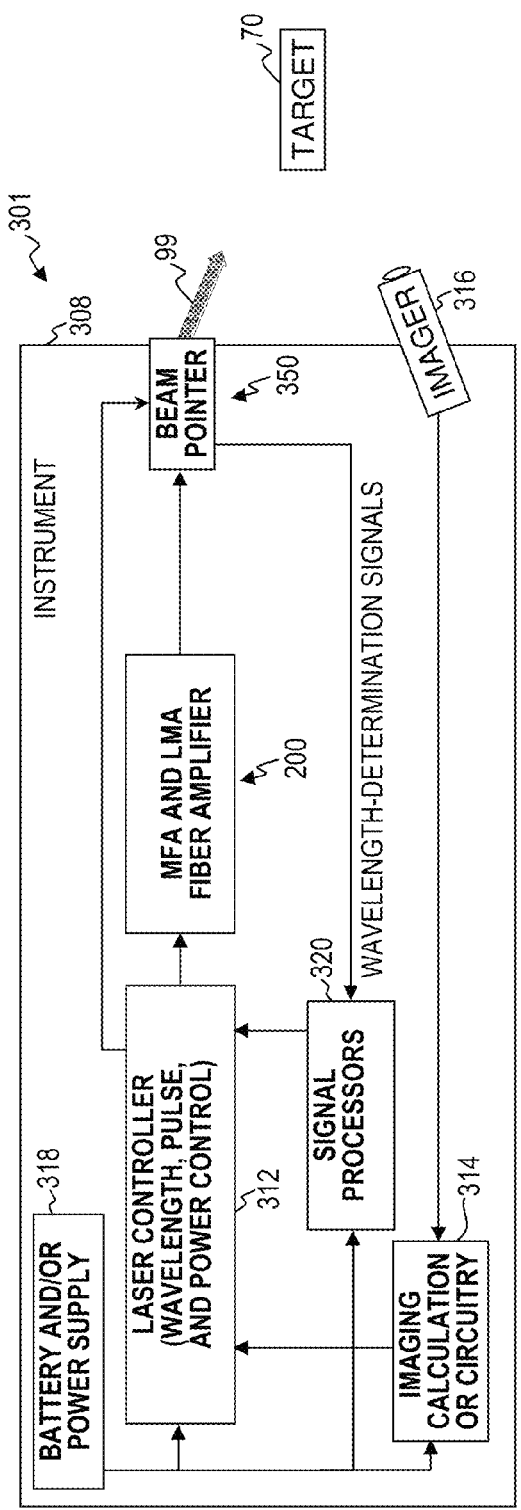
FIG. 3A is a block diagram of an instrument system 301 having a high-power mode-field-adaptor fiber-laser control system using one or more of the mode-field-adaptor fiber-laser systems as described herein.

FIG. 3A is a block diagram of an instrument system 301 having a high-power mode-field-adaptor fiber-laser control system using one or more of the mode-field-adaptor fiber-laser systems as described herein. In some embodiments, instrument system 301 (e.g., in some embodiments, a medical instrument such as a laser scalpel, optical stimulator for evoking nerve-action potentials in nerves of a human, skin or corneal ablator, or other medical instrument, or a material-processing instrument (such as for heat treatment of a surface, or welding or cutting) or the like) using one or more of the core pumped and cladding pumped mode-field adaptor and LMA gain fiber amplifiers 200 (such as subsystem 201 of FIG. 2A or subsystem 207 of FIG. 2G) as described herein. In some embodiments, system 301 includes the instrument and/or facility enclosure 308 and its other contents (e.g., engines and control systems), one or more battery and/or electrical power supplies 318, a laser controller 312 that provides the control of wavelength, pulse timing and duration for embodiments using pulse signals (other embodiments use CW signal beams), output-power control, direction control of the output beam and the like, optionally an imaging-calculation microprocessor and/or circuitry 314 that obtains an image signal from imager 316 and calculates such data as target location and size that is then delivered to laser controller 312, one or more signal processor 320 that, in some embodiments, receives wavelength-determination signals and/or directional-drift signals from the beam pointer module 350 (with its associated wavelength-, beam-off-axis and beam-off-angle detection sensors and circuitry, as described in U.S. Pat. No. 7,199,924 issued Apr. 3, 2007 to Andrew J. W. Brown et al., titled "Apparatus and method for spectral-beam combining of high-power fiber lasers," which is incorporated herein by reference), and that delivers wavelength-correction control data to laser controller 312. In some embodiments, laser controller 312 generates the control and power signals that are sent to fiber-laser module 200, which then delivers the high-power optical beam to beam pointer module 350, that points and outputs a single output laser SBC beam 99 that is directed toward target 70 (e.g., a tissue of a person to be treated or analyzed, or a material to be conditioned, welded or cut), according to the control information that was generated based on image information obtained from imager 316, or as directed by manual control of the device 308 or its beam pointer 350. In some embodiments, system 301 is part of, and used as an element of, a nerve-stimulation and surgical cutting/ablation medical instrument whose output is automatically controlled to prevent undesired damage to collateral tissue (such as described in commonly assigned U.S. Patent Application Publication 2008/0077200 titled "APPARATUS AND METHOD FOR STIMULATION OF NERVES AND AUTOMATED CONTROL OF SURGICAL INSTRUMENTS" by Bendett et al., which is incorporated herein by reference).

Figure 3B:
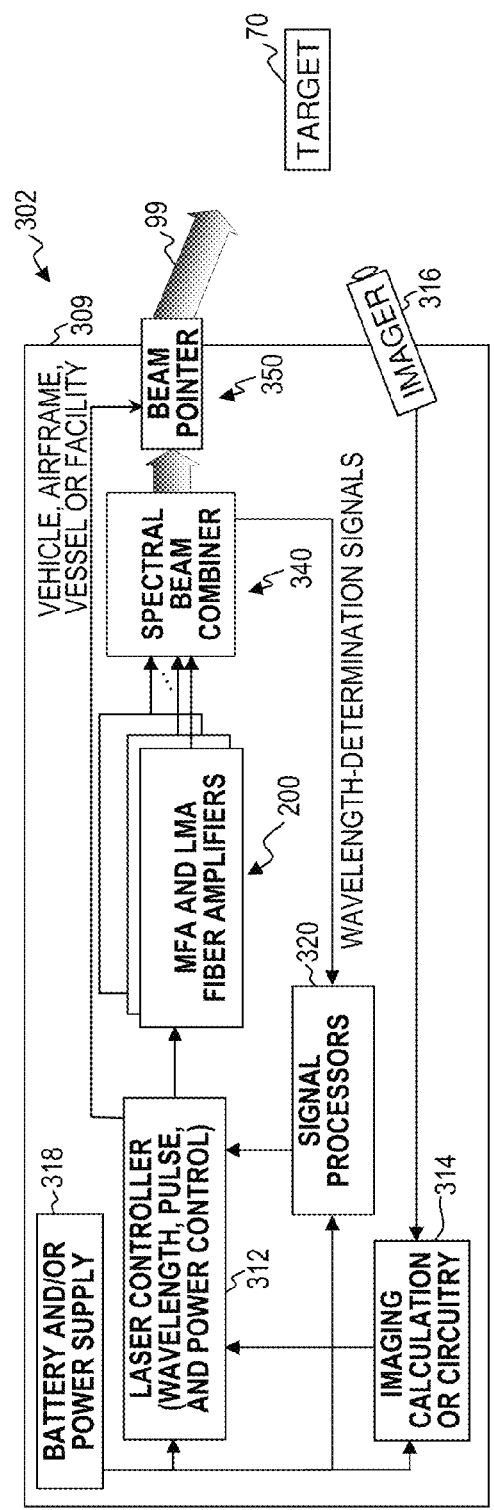
FIG. 3B is a block diagram of a vehicle 302 having a high-power mode-field-adaptor fiber-laser control system with a spectral-beam-combining unit using a plurality of the mode-field-adaptor fiber-laser systems as described herein.

FIG. 3B is a block diagram of a vehicle 302 having a high-power mode-field-adaptor fiber-laser control system with a spectral-beam-combining unit using a plurality of the mode-field-adaptor fiber-laser systems as described herein. In some embodiments, vehicle 302 (e.g., a vehicle such as a land vehicle (such as a tank or remotely-operated robotic vehicle), airframe (such as a helicopter or jet airplane), vessel (such as a frigate, destroyer or aircraft carrier) or facility (such as an airport or bunker)) using one or more of the core pumped and cladding pumped mode-field adaptor and LMA gain fiber amplifiers 200 (such as subsystem 201 of FIG. 2A or subsystem 207 of FIG. 2G) as described herein. In some embodiments, system 302 includes the vehicle, airframe, vessel or facility enclosure 309 and its other contents (e.g., engines and control systems), one or more battery and/or electrical power supplies 318, a laser controller 312 that provides the control of wavelength, pulse timing and duration for embodiments using pulse signals (other embodiments use CW signal beams), output-power control, direction control of the output beam and the like, an imaging calculation microprocessor and/or circuitry 314 that obtains an image signal from imager 316 and calculates such data as target location and velocity that is then delivered to laser controller 312, one or more signal processor 320 that receives wavelength-determination signals and/or directional-drift signals from the SBC module 340 (with its associated wavelength-, beam-off-axis and beam-off-angle detection sensors and circuitry, as described in U.S. Pat. No. 7,199,924 issued Apr. 3, 2007 to Andrew J. W. Brown et al., titled "Apparatus and method for spectral-beam combining of high-power fiber lasers," which is incorporated herein by reference), and that delivers wavelength-correction control data to laser controller 312. In some embodiments, laser controller 312 generates the control and power signals that are sent to each fiber-laser module 200, which then delivers high-power optical beams to SBC 340, which then combines the laser beams into a single output laser SBC beam 99 that is directed toward target 70 (e.g., a hostile aircraft or spacecraft or naval vessel), according to the control information that was generated based on image information obtained from imager 316. In some embodiments, system 301 is part of, and used as an element of, a directed-energy (DE) weapon carried by a vehicle 309 (such as a tank, an aircraft, or a naval vessel).

In some embodiments, fiber-laser modules 200 each output a CW beam having continuous power levels of 1 kW or more. In other embodiments, the fiber-laser modules 200 each output individual pulses having peak power levels of 10 kW or more. In other embodiments, the fiber-laser modules 200 each output individual pulses having peak power levels of 100 KW or more. In other embodiments, the fiber-laser modules 200 each output individual pulses having peak power levels of 1 MW or more. In some embodiments, laser controller 312 causes pulses of the laser beams to be in synchrony with one another such that the pulsed output 99 (which includes a series of pulses) approaches two megawatts or more of directed pulsed energy. In some embodiments, output 99 includes the CW power of a plurality of fiber-laser modules 200 such that the CW power in output 99 is between 1.001 kilowatts (kW) and 10 kW. In some embodiments, output 99 includes the pulsed power of a plurality of fiber-laser modules 200 such that the power in each of a plurality of pulses in output 99 is between 1.001 kilowatts (kW) and 10 kW. In some embodiments, a light pulse in output 99 is between 1.001 kW and 2 kW. In some embodiments, a light pulse in output 99 is between 2.001 kW and 4 kW. In some embodiments, a light pulse in output 99 is between 4.001 kW and 10 kW. In some embodiments, a light pulse in output 99 is between 10.001 kW and 20 kW. In some embodiments, a light pulse in output 99 is between 20.001 kW and 40 kW. In some embodiments, a light pulse in output 99 is between 40.001 kW and 100 kW. In some embodiments, a light pulse in output 99 is between 100.1 kW and 200 kW. In some embodiments, a light pulse in output 99 is between 200.1 kW and 400 kW. In some embodiments, a light pulse in output 99 is between 400.1 kW and 1.0 megawatt (MW). In some embodiments, a light pulse in output 99 is between 1.0001 MW and 2.0 MW. In some embodiments, a light pulse in output 99 is between 2.0001 MW and 4 MW. In some embodiments, a light pulse in output 99 is between 4.0001 MW and 10 MW. In some embodiments, a light pulse in output 99 is between 10.0001 MW and 100 MW. In some embodiments, a light pulse in output 99 has a power of at least 100 MW.

In some embodiments, a light pulse in output 99 has a power of at least 1 kW. In some embodiments, a light pulse in output 99 has a power of at least 2 kW. In some embodiments, a light pulse in output 99 has a power of at least 4 kW. In some embodiments, a light pulse in output 99 has a power of at least 10 kW. In some embodiments, a light pulse in output 99 has a power of at least 20 kW. In some embodiments, a light pulse in output 99 has a power of at least 40 kW. In some embodiments, a light pulse in output 99 has a power of at least 100 kW. In some embodiments, a light pulse in output 99 has a power of at least 200 kW. In some embodiments, a light pulse in output 99 has a power of at least 400 kW. In some embodiments, a light pulse in output 99 has a power of at least 1 megawatt (MW). In some embodiments, a light pulse in output 99 has a power of at least 2 MW. In some embodiments, a light pulse in output 99 has a power of at least 4 MW. In some embodiments, a light pulse in output 99 has a power of at least 10 MW.

Figure 4A:
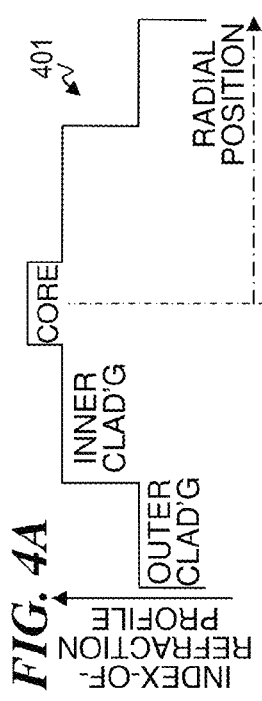
FIG. 4A is a schematic graph 401 of the index-of-refraction lateral cross-section of a double-clad small mode-field-area optical fiber (such as reference 210 as shown in FIG. 2E or reference 512 as shown in FIG. 5A or FIG. 5B), according to some embodiments of the present invention.

FIG. 4A is a schematic graph 401 of the index-of-refraction lateral cross-section of a double-clad small mode-field-area optical fiber (such as reference 210 as shown in FIG. 2E or reference 512 as shown in FIG. 5A or FIG. 5B), according to some embodiments of the present invention. As shown, the index of refraction is highest in the core, next highest in the inner cladding that surrounds the core at a larger radial distance from the center axis of the fiber (indicated by the vertical dash-dot line), and next highest in the outer cladding. The combined core-pump light and seed signal will stay in the core since its index is higher than that of the inner cladding, and cladding pump light in the inner cladding will remain within inward of the outer cladding due to the lower index of the outer cladding. Since the inner cladding is relatively large, most of the cladding pump light will not enter the core over a short or moderate distance.

Figure 4B:
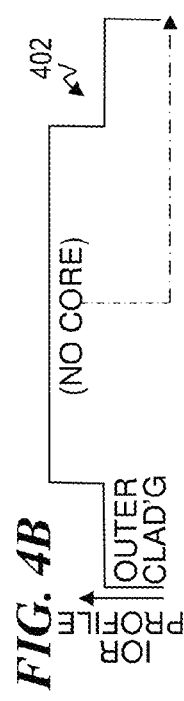
FIG. 4B is a schematic graph 402 of the index-of-refraction lateral cross-section of a cladding-pump-light-retaining section of coreless fiber (such as reference 217 as shown in FIG. 2F or reference 517 as shown in FIG. 5A), according to some embodiments of the present invention.

FIG. 4B is a schematic graph 402 of the index-of-refraction lateral cross-section of a cladding-pump-light-retaining section of coreless fiber (such as reference 217 as shown in FIG. 2F or reference 517 as shown in FIG. 5A), according to some embodiments of the present invention. As shown, there is no raised-index core, but there is a central area of higher index of refraction corresponding to the inner cladding of FIG. 4A to the same radial distance from the center axis of the fiber (indicated by the vertical dash-dot line) as the inner cladding, and this is surrounded by the outer cladding at a lower index of refraction. Since there is no raised-index core, so the combined seed signal and core pump light will expand in diameter, and cladding pump light in the inner cladding will remain within inward of the outer cladding due to the lower index of the outer cladding. Since the inner cladding is relatively large, most of the cladding pump light will not enter the central region over a short or moderate distance.

Figure 4C:
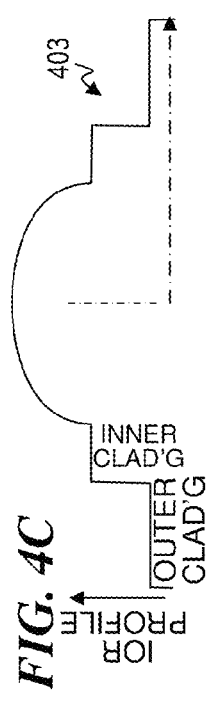
FIG. 4C is a schematic graph 403 of the index-of-refraction lateral cross-section of a cladding-pump-light-retaining section of coreless fiber (such as reference 218 as shown in FIG. 2F or reference 518 as shown in FIG. 5A), according to some embodiments of the present invention.

FIG. 4C is a schematic graph 403 of the index-of-refraction lateral cross-section of a cladding-pump-light-retaining section of GRIN fiber (such as reference 218 as shown in FIG. 2F or reference 518 as shown in FIG. 5A), according to some embodiments of the present invention. The rounded area of raised index in the center of the GRIN fiber provides a focussing function for the now-expanded combined seed signal and core pump light, which matches the lateral spatial mode to match the fundamental mode of the LMA fiber. Note also that surrounding the rounded area of raised index in the center of the GRIN fiber is an inner cladding that is surrounded by an outer cladding that together function to keep the cladding pump light inward of the outer cladding so that the cladding pump light is inserted to the inner cladding of the LMA fiber that follows.

Figure 4D:
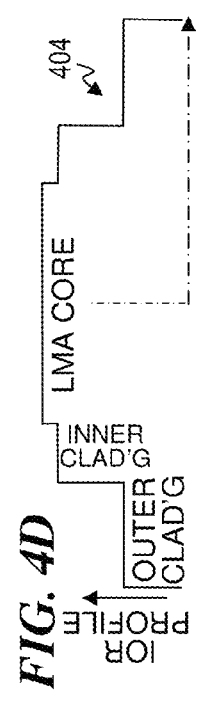
FIG. 4D is a schematic graph 404 of the index-of-refraction lateral cross-section of a double-clad large-mode-field-area (LMA) optical fiber (such as reference 246 as shown in FIG.

FIG. 4D is a schematic graph 404 of the index-of-refraction lateral cross-section of a double-clad large mode-field-area optical fiber (such as reference 246 as shown in FIG. 2E or reference 546 as shown in FIG. 5A or reference 549 of FIG. 5B), according to some embodiments of the present invention. As shown, the index of refraction is slightly higher in the large-mode-area core, next highest in the inner cladding that surrounds the LMA core at a larger radial distance from the center axis of the fiber (indicated by the vertical dash-dot line), and next highest in the outer cladding. The expanded and mode-matched combined core-pump light and seed signal will stay in the core since its index is higher than that of the inner cladding, and cladding pump light in the inner cladding will remain within inward of the outer cladding due to the lower index of the outer cladding. Since the inner cladding is relatively small, most of the cladding pump light will enter the core over a long or moderate distance. In some embodiments, the difference in index of the core relative to the inner cladding is small, in order that a single fundamental mode is the preferred mode.

FIG. 4E is a schematic graph 405 of the index-of-refraction lateral cross-section of a section of coreless fiber (such as reference 267 as shown in FIG. 2H or reference 567 as shown in FIG. 5B), according to some embodiments of the present invention. In some embodiments, the outer diameter of this coreless section is substantially equal to the diameter of the inner cladding of SMA fiber 210 or 512 and or the inner cladding of LMA fiber 248 or 548 in the other figures. In some such embodiments, once the short section of coreless fiber is fused in place, the device is coated with a lower index-of-refraction material that acts as an outer cladding in order that the device becomes a cladding-pump-light-retaining structure. See FIG. 5B for further details.

FIG. 4F is a schematic graph 406 of the index-of-refraction lateral cross-section of a section of GRIN fiber (such as reference 268 as shown in FIG. 2H or reference 568 as shown in FIG. 5A or FIG. 5B), according to some embodiments of the present invention. In some embodiments, the outer diameter of this GRIN section is substantially equal to the diameter of the inner cladding of SMA fiber 210 or 512 and or the inner cladding of LMA fiber 248 or 548 in the other figures. The GRIN fiber has a rounded index that provides a focussing function for the expanded combined seed signal and core pump light. In some such embodiments, once the short section of GRIN fiber is fused in place, the device is coated with a lower index-of-refraction material that acts as an outer cladding in order that the device becomes a cladding-pump-light-retaining structure. See FIG. 5B for further details.

FIG. 5A is a longitudinal-cross-section schematic diagram of an optical-amplifier subsystem 501 that includes a cladding-pump-retaining mode-field adaptor 511, according to some embodiments of the present invention. The cross-section-indication arrows labeled 4A, 4B, 4C and 4D in this figure are the locations to which the index-of-refraction graphs of FIG. 4A, FIG. 4B, FIG. 4C, and FIG. 4D refer. In some embodiments, subsystem 501 includes a small-mode-area (SMA) fiber 512 that is fused to a mode-field adaptor 511 that in turn is fused to a large-mode-area (LMA) fiber 546. In some embodiments, mode-field adaptor 511 includes a short section of non-core fiber 517 (e.g., in some embodiments, non-core fiber 517 is less than 1 mm in length, or in other embodiments, even less than 0.5 mm in length) having an outer cladding 534 that maintains cladding pump light inward of outer cladding 534. Non-core fiber 517 provides a beam-expansion function (as represented by the outward curving dotted line 507) for the combined seed signal and core-pump light emerging from core 532 of SMA fiber 512. Non-core fiber 517 is fused to short section of GRIN fiber 518 (e.g., in some embodiments, GRIN fiber 518 is less than 1 mm in length, or in other embodiments, even less than 0.5 mm in length). GRIN fiber 518 provides a beam-focussing function (as represented by the curving dotted line 508) for the combined seed signal and core-pump light that has been expanded by the short section of non-core fiber 517. In some embodiments, the length of non-core fiber 517 and the length of GRIN fiber 518 are selected according to the guidelines set forth below in order to convert the small-mode-field diameter beam from the core 532 of fiber 512 to provide a highly collimated single-mode beam that matches the mode-field diameter of LMA fiber 546. In some embodiments, optical-amplifier subsystem 501 receives combined seed light and core-pump light into the core 532 of double-clad small-mode-area (SMA) fiber 512 as described above for FIG. 2B, and a very large amount of cladding pump light into the inner cladding 533 of double-clad SMA fiber 512, as described above for FIG. 2C. In some embodiments, substantially all the cladding pump light in the inner cladding 533 (inward of outer cladding 534) is maintained inward of outer cladding 534 of the non-core fiber section 517, inward of outer cladding 534 of the GRIN fiber section 518, and then into inner cladding 537 of LMA fiber 546 (inward of the outer cladding 528 of LMA fiber 546). Thus the cladding pump light from SMA fiber 512 propagates as cladding pump light in LMA fiber 546 and gradually enters core 536 over the length of LMA fiber 546.

FIG. 5B is a longitudinal-cross-section schematic diagram of an optical-amplifier subsystem 502 that includes a mode-field adaptor 561, according to some embodiments of the present invention. This configuration is much the same as that of FIG. 5A, and the same reference numbers in each figure refer to the same structure. In FIG. 5B, the mode-field adaptor 261 does not include an outer cladding when assembled to this point, however, in some embodiments, the device is coated with a lower-index-of-refraction material in order to protect it and/or to form an outer cladding that provides a cladding-pump-light guiding function. The cross-section-indication arrows labeled 4A, 4E, 4F and 4D in this figure are the locations to which the index-of-refraction graphs of FIG. 4A, FIG. 4E, FIG. 4F, and FIG. 4D refer. In some embodiments, the LMA fiber 548 (having core 546, inner cladding 547 and outer cladding 548 has an undoped core and is later fused at its output end to a doped-core LMA gain fiber (such as gain fiber 246 of FIG. 2G).

FIG. 6A is a longitudinal-cross-section schematic diagram of a plain-glass-GRIN mode-field adaptor analysis 601 that shows a mode-field-adaptor ray graph 613 and associated equations, according to some embodiments of the present invention. Some embodiments use this to model the behavior of an all-glass interface even though this model and associated equations assume a section of air labeled $S_{AIR}$. To obtain an equivalent focal length $F_{EQUIV}$.

FIG. 6B is a lateral-cross-section index-of-refraction-profile graph GRIN lens 602 and associated equation, according to some embodiments of the present invention.

FIG. 6C is a longitudinal-cross-section schematic diagram of a mode-field-adaptor ray graph 603, according to some embodiments of the present invention.

FIG. 7A is a perspective-view longitudinal schematic diagram partially in cross section of a first step 701 (reference number 701 also refers to the collection of parts 701 for this step) of a method for fabricating a polarization-maintaining (PM) small-core to large-core mode-field adaptor of optical-amplifier subsystem 245 (see FIG. 2A), according to some embodiments of the present invention. In some embodiments, rather than trying to align and fuse very short lengths of non-core-with-outer-cladding fiber 217, a length that can be easily handled (e.g., a length of 2 cm or longer) of fiber 717 having an outer cladding 744 is aligned and fused to core-pump-cladding-pump-and-signal-fiber assembly 255 (e.g., which is already made having the core-launching fibers 233 and 238 fused to the left-hand end of small-MFD fiber 210, and one or more cladding-pump-light-launching fibers 214 fused to launch pump light into the inner cladding such that the output end 231 has a high-quality pump-light and signal-light combination in its core and cladding pump light in its inner cladding). In some embodiments, the parts 701 in FIG. 7A are first aligned and urged against one another (pushed together before fusing) and laser beams (e.g., in some embodiments, each at different wavelengths such as blue, green and red laser beams) are launched into the signal-light fiber 238, core-pump-light fiber 233, and cladding-pump-light fiber(s) 214, and the output light from the right-hand end of fiber 717 is examined. Incremental adjustments are made to the alignment until the desired light output is achieved and then the fibers are fused (in some embodiments, via radiant heat or laser welding) to form the in-process assembly 702 shown in FIG. 7B.

FIG. 7B is a perspective-view longitudinal schematic diagram partially in cross section of a second step 702 (reference number 702 also refers to the in-process assembly 702 at this step) of the method for fabricating optical-amplifier subsystem 245, according to some embodiments of the present invention. At this point in the method, the in-process assembly 702 has been fused together at the joint between fiber 231 and fiber 717.

FIG. 7C is a perspective-view longitudinal schematic diagram partially in cross section of a third step 703 (reference number 703 also refers to the in-process assembly 703 at this step) of the method for fabricating optical-amplifier subsystem 245, according to some embodiments of the present invention. At this point in the method, the in-process assembly 703 has been cleaved to a desired length for the coreless section 217 to the right-hand side of the joint between fiber 231 and what was fiber 717.

FIG. 7D is a perspective-view longitudinal schematic diagram partially in cross section of a fourth step 704 (reference number 704 also refers to the collection of parts 704 for this step) of the method for fabricating optical-amplifier subsystem 245, according to some embodiments of the present invention. In some embodiments, rather than trying to align and fuse very short lengths of GRIN fiber section 218, a length that can be easily handled (e.g., a length of 2 cm or longer) of GRIN fiber 718 having an outer cladding 744 is aligned and fused to core-pump-cladding-pump-and-signal-fiber assembly 255 with its fused section of non-core fiber 217. In some embodiments, the parts 704 in FIG. 7D are first aligned and urged against one another (pushed together before fusing) and one or more laser beams (e.g., in some embodiments, three beams each at different wavelengths such as blue, green and red laser beams) are launched into the signal-light fiber 238, core-pump-light fiber 233, and cladding-pump-light fiber(s) 214, and the output light from the right-hand end of GRIN fiber 718 is examined. Incremental adjustments are made to the alignment until the desired light output is achieved and then the fibers are fused (in some embodiments, via radiant heat or laser welding) to form the in-process assembly 705 shown in FIG. 7E.

FIG. 7E is a perspective-view longitudinal schematic diagram partially in cross section of a fifth step 705 (reference number 705 also refers to the in-process assembly 705 at this step) of the method for fabricating optical-amplifier subsystem 245, according to some embodiments of the present invention. At this point in the method, the in-process assembly 705 has been fused together at the joint between fiber piece 217 and GRIN fiber 718.

FIG. 7F is a perspective-view longitudinal schematic diagram partially in cross section of a sixth step 706 (reference number 706 also refers to the in-process assembly 706 at this step) of the method for fabricating optical-amplifier subsystem 245, according to some embodiments of the present invention. At this point in the method, the in-process assembly 706 has been cleaved to a desired length for the GRIN section 218 to the right-hand side of the joint between fiber piece 217 and what was GRIN fiber 718.

FIG. 7G is a perspective-view longitudinal schematic diagram partially in cross section of a seventh step 707 (reference number 707 also refers to the collection of parts 707 for this step) of the method for fabricating optical-amplifier subsystem 245, according to some embodiments of the present invention. In some embodiments, the parts 707 in FIG. 7G are first aligned and urged against one another (pushed together before fusing) and one or more laser beams (e.g., in some embodiments, three beams each at different wavelengths such as blue, green and red laser beams, but, in some embodiments, wherein at least the signal beam is polarized) are launched into the signal-light fiber 238, core-pump-light fiber 233, and cladding-pump-light fiber(s) 214, and the output light from the right-hand end of gain fiber 246 is examined. Incremental adjustments are made (including rotation adjustments made such that the polarized signal from fiber 231 aligns to the polarized orientation of polarization-maintaining gain fiber 246) to the alignment and rotation until the desired light output is achieved (this alignment is shown in FIG. 7H) and then the fibers are fused (in some embodiments, via radiant heat or laser welding) to form the in-process assembly 709 shown in FIG. 7i.

FIG. 7H is a perspective-view longitudinal schematic diagram partially in cross section of an eighth step 708 (reference number 708 also refers to the collection of parts 708 for this step) of the method for fabricating optical-amplifier subsystem 245, according to some embodiments of the present invention. Note that this FIG. 7H shows the same parts as those shown in FIG. 7G, except that here, gain fiber 246 has been rotated such that the polarization rods 264 (and the polarization axis of the mode supported by the core) have been aligned to the polarized signal beam coming from fiber 231.

FIG. 7i is a perspective-view longitudinal schematic diagram partially in cross section of a ninth step 709 (reference number 709 also refers to the in-process assembly 709 at this step) of the method for fabricating optical-amplifier subsystem 245, according to some embodiments of the present invention. At this point in the method, the in-process assembly 709 has been fused into a completed fiber subassembly. In some embodiments, additional stems are executed to fuse a delivery fiber and/or endcap to the right-hand end of assembly 709.

Some embodiments of the method further include providing a vehicle having an enclosure; supplying electrical power; using the electrical power, controlling and powering the MOPA system of the present invention including its mode-field adaptor; and controlling an output direction of the single output beam in one of a plurality of different possible directions relative to the vehicle.

Some embodiments of the apparatus further include a vehicle having an enclosure; an electrical power supply attached to the vehicle; a laser controller operatively coupled to receive electrical power from the electrical power supply and operably coupled to power and control the MOPA system of the present invention including its mode-field adaptor; and a beam-direction controller operably coupled to receive the single output beam from the spectral-beam combiner and operable to direct the single output beam in one of a plurality of different possible directions relative to the vehicle.

In some embodiments, the present invention provides a method that includes providing a first fiber section having a first core having a first core diameter, a mode-field adaptor optically coupled to the first fiber section and a second fiber section having a second core having a second core diameter that is larger than the first core diameter, wherein the second fiber section is optically coupled to the mode-field adaptor, and wherein the second fiber section an inner cladding layer surrounding the core and a second cladding layer surrounding the inner cladding layer; combining an optical seed signal and core pump light into the first core; expanding and matching a lateral spatial mode of the combined seed signal and core pump light to a mode of the second core, and guiding the expanded combined seed signal and core pump light into the second core; guiding cladding pump light into the inner cladding layer of the second fiber section; and optically amplifying the seed signal using energy from both the core pump light and energy from the cladding pump light.

In some embodiments of the method, the seed signal in the first core is polarized; the expanded combined seed signal in the second core is polarized; and the expanding and matching of the lateral spatial mode of the combined seed signal and core pump light, and the guiding of the expanded combined seed signal and core pump light into the second core includes maintaining the polarization of the seed signal from the first core into the second core, and wherein the optically amplifying includes both amplifying and maintaining the polarization of the seed signal.

In some embodiments, the first fiber section further includes an inner cladding layer that surrounds the first core and a second cladding layer that surrounds the inner cladding layer, and the method further includes guiding cladding pump light into the inner cladding of the first fiber section, wherein the guiding of the cladding pump light into the inner cladding of the second fiber section includes guiding the cladding pump light from the inner cladding of the first fiber section into the inner cladding of the second fiber section.

In some embodiments, the first fiber section further includes an inner cladding layer that surrounds the first core and a second cladding layer that surrounds the inner cladding layer, and the method further includes generating the seed signal as a polarized optical seed signal at a signal wavelength and having a polarization direction before the combining of the seed signal with the core pump light; generating the core pump light at a first pump wavelength before the combining of the seed signal with the core pump light; maintaining the polarization direction of the seed signal in the first fiber section; maintaining the polarization direction of the seed signal as the seed signal is being amplified in the second fiber section; generating the cladding pump light at a second pump wavelength, and guiding the cladding pump light into the inner cladding of the first fiber section, wherein the guiding of the cladding pump light into the inner cladding of the second fiber section includes guiding the cladding pump light from the inner cladding of the first fiber section into the inner cladding of the second fiber section; and wherein the second fiber section includes a polarization-maintaining large-mode-area rare-earth-doped gain region in the second core, and the optically amplifying includes optically amplifying the polarized seed signal and outputting a resulting amplified polarized output beam.

Some embodiments further include providing a vehicle having an enclosure; supplying electrical power; using the electrical power, controlling and powering the optically amplifying of the seed signal into an output beam; and controlling an output direction of the output beam in one of a plurality of different possible directions relative to the vehicle.

Some embodiments further include providing an instrument having an enclosure; supplying electrical power; using the electrical power, controlling and powering the optically amplifying of the seed signal into an output beam; and controlling an output direction of the output beam in one of a plurality of different possible directions relative to the enclosure.

In some embodiments, the present invention provides an apparatus that includes a first fiber section that has a first core, wherein the first core has a first core diameter; a second fiber section that has a second core, wherein the second core has a large-mode-area second core diameter that is larger than the first core diameter and wherein the second fiber section includes an inner cladding that surrounds the second core and a second cladding layer that surrounds the inner cladding layer of the second fiber section; means (as described herein) for guiding cladding pump light into the inner cladding layer of the second fiber section; means for combining core pump light and an optical seed signal into the first core; means for expanding and matching a lateral spatial mode of the combined seed signal and core pump light to a mode of the second core, and guiding the expanded combined seed signal and core pump light into the second core; and means for optically amplifying the seed signal using energy from both the core pump light and energy from the cladding pump light.

Some embodiments of the apparatus further include means for maintaining a polarization direction of the seed signal in the first core; means for maintaining a polarization direction of the expanded combined seed signal in the second core; and wherein the means for expanding and matching the lateral spatial mode of the combined seed signal and core pump light, and the guiding of the expanded combined seed signal and core pump light into the second core includes maintaining the polarization of the seed signal from the first core into the second core, and wherein the means for optically amplifying includes means for both amplifying and maintaining the polarization of the seed signal.

In some embodiments of the apparatus, the first fiber section further includes an inner cladding layer that surrounds the first core and a second cladding layer that surrounds the inner cladding layer, and the apparatus further includes means for guiding cladding pump light into the inner cladding of the first fiber section, wherein the means for guiding of the cladding pump light into the inner cladding of the second fiber section includes means for guiding the cladding pump light from the inner cladding of the first fiber section into the inner cladding of the second fiber section.

In some embodiments of the apparatus, the first fiber section further includes an inner cladding layer that surrounds the first core and a second cladding layer that surrounds the inner cladding layer, and the apparatus further includes: means for generating the seed signal as a polarized optical seed signal at a signal wavelength and having a polarization direction before the combining of the seed signal with the core pump light; means for generating the core pump light at a first pump wavelength before the combining of the seed signal with the core pump light; means for maintaining the polarization direction of the seed signal in the first fiber section; means for maintaining the polarization direction of the seed signal as the seed signal is being amplified in the second fiber section; means for generating the cladding pump light at a second pump wavelength, and means for guiding the cladding pump light into the inner cladding of the first fiber section, wherein the means for guiding of the cladding pump light into the inner cladding of the second fiber section includes means for guiding the cladding pump light from the inner cladding of the first fiber section into the inner cladding of the second fiber section; and wherein the second fiber section includes a polarization-maintaining large-mode-area rare-earth-doped gain region in the second core, and the means for optically amplifying includes means for optically amplifying the polarized seed signal and outputting a resulting amplified polarized output beam.

Some embodiments of the apparatus further include a vehicle having an enclosure; means for supplying electrical power within the vehicle; means for using the electrical power, including means for controlling and means for powering the means for optically amplifying of the seed signal into an output beam; and means for controlling an output direction of the output beam in one of a plurality of different possible directions relative to the vehicle.

Some embodiments of the apparatus further include an instrument having an enclosure; means for supplying electrical power; means for using the electrical power, including means for controlling and means for powering the means for optically amplifying of the seed signal into an output beam; and means for controlling an output direction of the output beam in one of a plurality of different possible directions relative to the enclosure.

In some embodiments, the present invention provides an apparatus that includes a first fiber section that has a first core, wherein the first core has a first core diameter; a mode-field adaptor, wherein the mode-field adaptor includes a first portion optically coupled to the first fiber section, wherein the first portion has a central volume that has a substantially constant index-of-refraction radial profile and a diameter larger than the first core diameter, and a second portion that has a graded-index (GRIN) central volume, wherein the GRIN central volume has a central axis and a graded index-of-refraction radial profile having an index that gradually decreases at larger distances from its central axis; and a second fiber section that has a second core, wherein the second core has a large-mode-area second core diameter that is larger than the first core diameter, wherein the second fiber section is optically coupled to the second portion of the mode-field adaptor, and wherein the second fiber section includes an inner cladding that surrounds the second core and a second cladding layer that surrounds the inner cladding layer of the second fiber section.

In some embodiments, the first fiber section further includes an inner cladding layer that surrounds the first core and a second cladding layer that surrounds the inner cladding layer; and the mode-field adaptor further includes a cladding layer, wherein an inner diameter of the second cladding layer of the first fiber section is substantially equal to an inner diameter of the cladding layer of the mode-field adaptor and substantially equal to an inner diameter of the second cladding layer of the second fiber section, wherein light in the inner cladding of the first fiber section is substantially contained inward of the cladding layer of the mode-field adaptor and enters the inner cladding of the second fiber section.

In some embodiments, the first fiber section is a polarization-maintaining (PM) fiber characterized by a polarization direction; the second fiber section is a polarization-maintaining (PM) fiber characterized by a polarization direction that is aligned to the polarization direction of the first fiber section.

In some embodiments, the first fiber section is a polarization-maintaining (PM) fiber characterized by a polarization direction; the second fiber section is a polarization-maintaining (PM) fiber characterized by a polarization direction that is aligned to the polarization direction of the first fiber section.

In some embodiments, the first fiber section further includes an inner cladding layer that surrounds the first core and a second cladding layer that surrounds the inner cladding layer, and an optical combiner configured to guide cladding pump light into the inner cladding of the first fiber section; the mode-field adaptor further includes a cladding layer, wherein an inner diameter of the second cladding layer of the first fiber section is substantially equal to an inner diameter of the cladding layer of the mode-field adaptor and substantially equal to an inner diameter of the second cladding layer of the second fiber section, wherein the cladding pump light in the inner cladding of the first fiber section is substantially contained inward of the cladding layer of the mode-field adaptor and enters the inner cladding of the second fiber section; and the second fiber section further includes a rare-earth-doped region in the second core configured to optically amplify the seed signal using energy from the core pump light and energy from the cladding pump light.

In some embodiments, the second fiber section includes a rare-earth-doped region in the second core.

Some embodiments further include a first optical combiner that combines an optical seed signal and core pump light into the first core.

In some embodiments, the seed signal is polarized; and the mode-field adaptor is configured to expand and match a lateral spatial mode of the combined core pump light and polarized seed signal to a polarized mode of the second core.

In some embodiments, the first fiber section includes an inner cladding layer that surrounds the first core and a second cladding layer that surrounds the inner cladding layer, and an optical combiner configured to guide cladding pump light into the inner cladding of the first fiber section; the first fiber section is a polarization-maintaining (PM) fiber characterized by a polarization direction; the second fiber section is a polarization-maintaining (PM) fiber characterized by a polarization direction that is aligned to the polarization direction of the first fiber section; and the apparatus further includes: a seed-signal source that outputs a polarized optical seed signal at a signal wavelength, a first pump-light source that outputs pump light at a first pump wavelength, a first optical combiner optically coupled to the seed-signal source and the first pump-light source, wherein the first optical combiner combines the pump light from the first pump source and the polarized seed signal from the seed-signal source to form combined core pump light and polarized seed signal that is guided into the first core, a second pump-light source that outputs pump light at a second pump wavelength, and a second optical combiner that guides the pump light from the second pump source into the inner cladding of the first fiber section to form cladding pump light, wherein the mode-field adaptor includes a cladding layer, wherein an inner diameter of the second cladding layer of the first fiber section is substantially equal to an inner diameter of the cladding layer of the mode-field adaptor and substantially equal to an inner diameter of the second cladding layer of the second fiber section, wherein the cladding pump light in the inner cladding of the first fiber section is substantially contained inward of the cladding layer of the mode-field adaptor and enters the inner cladding of the second fiber section, and wherein the second fiber section includes a large-mode-area rare-earth-doped gain region in the second core configured to optically amplify the polarized seed signal using energy from the core pump light and energy from the cladding pump light and to output an amplified polarized output beam.

Some embodiments further include a vehicle having an enclosure; an electrical power supply attached to the vehicle; a laser controller operatively coupled to receive electrical power from the electrical power supply and operably coupled to power and control the seed-signal source, the first pump-light source, and the second pump source to generate and amplify the seed signal; and a beam-direction controller operably coupled to receive the amplified polarized output beam from the second fiber section and operable to direct the output beam in one of a plurality of different possible directions relative to the vehicle.

In some embodiments, the seed source is a laser, and the apparatus further includes: a medical instrument having an enclosure; an electrical power supply attached to the medical instrument; a laser controller operatively coupled to receive electrical power from the electrical power supply and operably coupled to power and control the laser seed-signal source, the first pump-light source, and the second pump source to generate and amplify the laser seed signal; and a beam-direction controller operably coupled to receive the amplified polarized output beam from the second fiber section and operable to direct the single output beam in one of a plurality of different possible directions relative to the enclosure.

In some embodiments, the present invention provides a method for fabricating a small-core to large-core mode-field adaptor having a light-guiding inner cladding, the method including providing a plurality of optical fibers including a first and a second outside optical fiber and a first and a second inside optical fiber, the outside optical fibers including a small-core optical fiber and a large-core optical fiber, and the inside optical fibers including a non-guiding optical fiber and a graded-index (GRIN) optical fiber; fusing the first inside optical fiber to the first outside optical fiber; cleaving the first inside optical fiber to a first length; fusing the second inside optical fiber to the first inside optical fiber; cleaving the second inside optical fiber to a second length; and fusing the second outside optical fiber to the second inside optical fiber.

In some embodiments of the method, the first outside optical fiber is a polarization-maintaining (PM) fiber having a polarization direction, and the second outside optical fiber is a polarization-maintaining (PM) fiber having a polarization direction, the method further including: before the fusing of the second outside optical fiber to the second inside optical fiber, launching test light into the first outside optical fiber, positioning the second outside optical fiber relative to the first outside optical fiber such that the test light transfers between the first outside optical fiber and the second outside optical fiber, and measuring received test light from the second outside optical fiber, and rotating the second outside optical fiber relative to the first outside optical fiber until the measured received test light indicates an alignment of the polarization direction of the first outside optical fiber to the polarization direction of the second outside optical fiber.

In some embodiments of the method, the fusing of the first inside optical fiber to the first outside optical fiber and the fusing of the second inside optical fiber to the first inside optical fiber are both performed before the positioning of the second outside optical fiber relative to the first outside optical fiber.

In some embodiments of the method, the first outside optical fiber is the small-core optical fiber, the second outside optical fiber is the large-core optical fiber, the first inside optical fiber is the non-guiding optical fiber and the second inside optical fiber is the GRIN optical fiber.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
   providing a first fiber section having a first core having a first core diameter, a mode-field adaptor optically coupled to the first fiber section, and a second fiber section having a second core having a second core diameter that is larger than the first core diameter, wherein the second fiber section is optically coupled to the mode-field adaptor, and wherein the second fiber section includes an inner cladding layer surrounding the second core and a second cladding layer surrounding the inner cladding layer;
   combining an optical seed signal and core pump light into the first core;
   expanding and matching a lateral spatial mode of the combined seed signal and core pump light to a mode of the second core, and guiding the expanded combined seed signal and core pump light into the second core;
   guiding cladding pump light into the inner cladding layer of the second fiber section; and
   optically amplifying the seed signal using energy from both the core pump light and energy from the cladding pump light.

2. The method of claim 1, wherein:
   the seed signal in the first core is polarized;
   the expanded combined seed signal in the second core is polarized; and
   the expanding and matching of the lateral spatial mode of the combined seed signal and core pump light, and the guiding of the expanded combined seed signal and core pump light into the second core includes maintaining the polarization of the seed signal from the first core into the second core, and wherein the optically amplifying includes both amplifying and maintaining the polarization of the seed signal.

3. The method of claim 1, wherein the first fiber section further includes an inner cladding layer that surrounds the first core and a second cladding layer that surrounds the inner cladding layer, and wherein the method further comprises:
   guiding cladding pump light into the inner cladding of the first fiber section, wherein the guiding of the cladding pump light into the inner cladding of the second fiber section includes guiding the cladding pump light from the inner cladding of the first fiber section into the inner cladding of the second fiber section.

4. The method of claim 1, wherein the first fiber section further includes an inner cladding layer that surrounds the first core and a second cladding layer that surrounds the inner cladding layer, and wherein the method further comprises:

generating the seed signal as a polarized optical seed signal at a signal wavelength and having a polarization direction before the combining of the seed signal with the core pump light;

generating the core pump light at a first pump wavelength before the combining of the seed signal with the core pump light;

maintaining the polarization direction of the seed signal in the first fiber section;

maintaining the polarization direction of the seed signal as the seed signal is being amplified in the second fiber section;

generating the cladding pump light at a second pump wavelength, and guiding the cladding pump light into the inner cladding of the first fiber section, wherein the guiding of the cladding pump light into the inner cladding of the second fiber section includes guiding the cladding pump light from the inner cladding of the first fiber section into the inner cladding of the second fiber section; and wherein the second fiber section includes a polarization-maintaining large-mode-area rare-earth-doped gain region in the second core, and the optically amplifying includes optically amplifying the polarized seed signal and outputting a resulting amplified polarized output beam.

5. The method of claim 1, further comprising:
providing a vehicle having an enclosure;
supplying electrical power;
using the electrical power, controlling and powering the optically amplifying of the seed signal into an output beam; and
controlling an output direction of the output beam in one of a plurality of different possible directions relative to the vehicle.

6. The method of claim 1, further comprising:
providing an instrument having an enclosure;
supplying electrical power;
using the electrical power, controlling and powering the optically amplifying of the seed signal into an output beam; and
controlling an output direction of the output beam in one of a plurality of different possible directions relative to the enclosure.

7. An apparatus comprising:
a first fiber section that has a first core, wherein the first core has a first core diameter;
a second fiber section that has a second core, wherein the second core has a large-mode-area second core diameter that is larger than the first core diameter and wherein the second fiber section includes an inner cladding that surrounds the second core and a second cladding layer that surrounds the inner cladding layer of the second fiber section;
means for guiding cladding pump light into the inner cladding layer of the second fiber section;
means for combining core pump light and an optical seed signal into the first core;
means for expanding and matching a lateral spatial mode of the combined seed signal and core pump light to a mode of the second core, and guiding the expanded combined seed signal and core pump light into the second core; and
means for optically amplifying the seed signal using energy from both the core pump light and energy from the cladding pump light.

8. The apparatus of claim 7, further comprising:
means for maintaining a polarization direction of the seed signal in the first core;
means for maintaining a polarization direction of the expanded combined seed signal in the second core; and wherein the means for expanding and matching the lateral spatial mode of the combined seed signal and core pump light, and the guiding of the expanded combined seed signal and core pump light into the second core includes maintaining the polarization of the seed signal from the first core into the second core, and wherein the means for optically amplifying includes means for both amplifying and maintaining the polarization of the seed signal.

9. The apparatus of claim 7, wherein the first fiber section further includes an inner cladding layer that surrounds the first core and a second cladding layer that surrounds the inner cladding layer, and wherein the apparatus further comprises:
means for guiding cladding pump light into the inner cladding of the first fiber section, wherein the means for guiding of the cladding pump light into the inner cladding of the second fiber section includes means for guiding the cladding pump light from the inner cladding of the first fiber section into the inner cladding of the second fiber section.

10. The apparatus of claim 7, wherein the first fiber section further includes an inner cladding layer that surrounds the first core and a second cladding layer that surrounds the inner cladding layer, and wherein the apparatus further comprises:
means for generating the seed signal as a polarized optical seed signal at a signal wavelength and having a polarization direction before the combining of the seed signal with the core pump light;
means for generating the core pump light at a first pump wavelength before the combining of the seed signal with the core pump light;
means for maintaining the polarization direction of the seed signal in the first fiber section;
means for maintaining the polarization direction of the seed signal as the seed signal is being amplified in the second fiber section;
means for generating the cladding pump light at a second pump wavelength, and
means for guiding the cladding pump light into the inner cladding of the first fiber section, wherein the means for guiding of the cladding pump light into the inner cladding of the second fiber section includes means for guiding the cladding pump light from the inner cladding of the first fiber section into the inner cladding of the second fiber section; and
wherein the second fiber section includes a polarization-maintaining large-mode-area rare-earth-doped gain region in the second core, and the means for optically amplifying includes means for optically amplifying the polarized seed signal and outputting a resulting amplified polarized output beam.

11. The apparatus of claim 7, further comprising:
a vehicle having an enclosure;
means for supplying electrical power within the vehicle;
means for using the electrical power, including means for controlling and means for powering the means for optically amplifying of the seed signal into an output beam; and
means for controlling an output direction of the output beam in one of a plurality of different possible directions relative to the vehicle.

12. The apparatus of claim 7, further comprising:
an instrument having an enclosure;
means for supplying electrical power;
means for using the electrical power, including means for controlling and means for powering the means for optically amplifying of the seed signal into an output beam; and
means for controlling an output direction of the output beam in one of a plurality of different possible directions relative to the enclosure.

13. An apparatus comprising:
a first fiber section that has a first core, wherein the first core has a first core diameter;
a mode-field adaptor, wherein the mode-field adaptor includes a first portion optically coupled to the first fiber section, wherein the first portion has a central volume that has a substantially constant index-of-refraction radial profile and a diameter larger than the first core diameter, and a second portion that has a graded-index (GRIN) central volume, wherein the GRIN central volume has a central axis and a graded index-of-refraction radial profile having an index that gradually decreases at larger distances from its central axis; and
a second fiber section that has a second core, wherein the second core has a large-mode-area second core diameter that is larger than the first core diameter, wherein the second fiber section is optically coupled to the second portion of the mode-field adaptor, and wherein the second fiber section includes an inner cladding that surrounds the second core and a second cladding layer that surrounds the inner cladding layer of the second fiber section.

14. The apparatus of claim 13, wherein:
the first fiber section further includes an inner cladding layer that surrounds the first core and a second cladding layer that surrounds the inner cladding layer; and
the mode-field adaptor further includes a cladding layer, wherein an inner diameter of the second cladding layer of the first fiber section is substantially equal to an inner diameter of the cladding layer of the mode-field adaptor and substantially equal to an inner diameter of the second cladding layer of the second fiber section, wherein light in the inner cladding of the first fiber section is substantially contained inward of the cladding layer of the mode-field adaptor and enters the inner cladding of the second fiber section.

15. The apparatus of claim 14, wherein:
the first fiber section is a polarization-maintaining (PM) fiber characterized by a polarization direction; and
the second fiber section is a polarization-maintaining (PM) fiber characterized by a polarization direction that is aligned to the polarization direction of the first fiber section.

16. The apparatus of claim 13, wherein:
the first fiber section is a polarization-maintaining (PM) fiber characterized by a polarization direction; and
the second fiber section is a polarization-maintaining (PM) fiber characterized by a polarization direction that is aligned to the polarization direction of the first fiber section.

17. The apparatus of claim 13, wherein:
the first fiber section further includes an inner cladding layer that surrounds the first core and a second cladding layer that surrounds the inner cladding layer, a first optical combiner configured to guide core pump light and a seed signal into the core of the first fiber section, and a second optical combiner configured to guide cladding pump light into the inner cladding of the first fiber section;
the mode-field adaptor further includes a cladding layer, wherein an inner diameter of the second cladding layer of the first fiber section is substantially equal to an inner diameter of the cladding layer of the mode-field adaptor and substantially equal to an inner diameter of the second cladding layer of the second fiber section, wherein the cladding pump light in the inner cladding of the first fiber section is substantially contained inward of the cladding layer of the mode-field adaptor and enters the inner cladding of the second fiber section; and
the second fiber section further includes a rare-earth-doped region in the second core configured to optically amplify the seed signal using energy from the core pump light and energy from the cladding pump light.

18. The apparatus of claim 13, wherein the second fiber section includes a rare-earth-doped region in the second core.

19. The apparatus of claim 13, further comprising a first optical combiner that combines an optical seed signal and core pump light into the first core.

20. The apparatus of claim 13, wherein:
the first fiber section includes an inner cladding layer that surrounds the first core and a second cladding layer that surrounds the inner cladding layer;
the first fiber section is a polarization-maintaining (PM) fiber characterized by a polarization direction;
the second fiber section is a polarization-maintaining (PM) fiber characterized by a polarization direction that is aligned to the polarization direction of the first fiber section; and
wherein the apparatus further comprises:
a seed-signal source that outputs a polarized optical seed signal at a signal wavelength,
a first pump-light source that outputs pump light at a first pump wavelength,
a first optical combiner optically coupled to the seed-signal source and the first pump-light source, wherein the first optical combiner combines the pump light from the first pump source and the polarized seed signal from the seed-signal source to form combined core pump light and polarized seed signal that is guided into the first core,
a second pump-light source that outputs pump light at a second pump wavelength, and
a second optical combiner that guides the pump light from the second pump source into the inner cladding of the first fiber section to form cladding pump light, wherein the mode-field adaptor includes a cladding layer, wherein an inner diameter of the second cladding layer of the first fiber section is substantially equal to an inner diameter of the cladding layer of the mode-field adaptor and substantially equal to an inner diameter of the second cladding layer of the second fiber section, wherein the cladding pump light in the inner cladding of the first fiber section is substantially contained inward of the cladding layer of the mode-field adaptor and enters the inner cladding of the second fiber section, and wherein the second fiber section includes a large-mode-area rare-earth-doped gain region in the second core configured to optically amplify the polarized seed signal using energy from the core pump light and energy from the cladding pump light and to output an amplified polarized output beam.

21. A method for fabricating a small-core to large-core mode-field adaptor having a light guiding inner cladding, the method comprising:
provinding a plurality of optical fibers including a first and a second outside optical fiber and a first and a second inside optical fiber, the outside optical fibers including a small-core optical fiber and a large-core optical fiber, and the inside optical fibers including a non-guiding optical fiber and a graded-index (GRIN) optical fiber;
fusing the first inside optical fiber to the first outside optical fiber;
cleaving the first inside optical fiber to a first length;
fusing the second inside optical fiber to the first inside optical fiber;
cleaving the second inside optical fiber to a second length; and
fusing the second outside optical fiber to the second inside optical fiber.

22. The method of claim 21, wherein the first outside optical fiber is a polarization maintaining (PM) fiber having a polarization direction, and wherein the second outside optical fiber is a polarization-maintaining (PM) fiber having a polarization direction, the method further comprising:
before the fusing of the second outside optical fiber to the second inside optical fiber, launching test light into the first outside optical fiber,
positioning the second outside optical fiber relative to the first outside optical fiber such that the test light transfers between the first outside optical fiber and the second outside optical fiber,
measuring received test light from the second outside optical fiber, and
rotating the second outside optical fiber relative to the first outside optical fiber until the measured received test light indicates an alignment of the polarization direction of the first outside optical fiber to the polarization direction of the second outside optical fiber.

23. The method of claim 22, wherein the fusing of the first inside optical fiber to the first outside optical fiber and the fusing of the second inside optical fiber to the first inside optical fiber are both performed before the positioning of the second outside optical fiber relative to the first outside optical fiber.

24. The method of claim 21, wherein the first outside optical fiber is the small-core optical fiber, the second outside optical fiber is the large-core optical fiber, the first inside optical fiber is the non-guiding optical fiber and the second inside optical fiber is the GRIN optical fiber.

25. The apparatus of claim 13, wherein the mode-field adaptor has a first outer diameter, and the second fiber section has a outer diameter, and wherein the second outer diameter is larger than the first outer diameter.

26. The apparatus of claim 13, further comprising a cladding-pump injector structure that injects cladding-pump light into the inner cladding of the second fiber section.

27. The apparatus of claim 13, further comprising:
a vehicle having an enclosure, wherein the enclosure contains the first fiber section, the mode-field adaptor, and the second fiber section;
an electrical power supply within the vehicle;
a first source of optical pump light operatively coupled to receive power from the electrical power supply and to generate core pump light;
a seed source that generates a seed signal;
a first optical combiner operatively coupled to receive the seed signal and operatively coupled to receive the core pump light from the first source of optical pump light and to deliver the core pump light and the seed signal into the first core of the first fiber section;
a second source of optical pump light operatively coupled to receive power from the electrical power supply and to generate cladding pump light;
a second pump-light-delivery fiber and a cladding-pump-light injector operatively coupled to receive the cladding pump light from the second source of optical pump light and to deliver the cladding pump light to the an inner cladding of the second fiber section;
a controller operatively coupled to control the seed source, the first source of optical pump light, and the second source of optical pump light to control generation of a first output beam;
a spectral beam combiner (SBC) module that receives the first output beam and a plurality of additional output beams and generates a spectral-beam-combined output beam; and
a beam pointer that receives the spectral-beam-combined output beam from the SBC module and controls an output direction of the spectral-beam-combined output beam in one of a plurality of different possible directions relative to the vehicle.

* * * * *